United States Patent
Kwon

(10) Patent No.: US 10,136,248 B2
(45) Date of Patent: Nov. 20, 2018

(54) PORTABLE APPARATUS AND METHOD OF CONTROLLING LOCATION INFORMATION OF PORTABLE APPARATUS

(71) Applicant: Samsung Electronics Co., Ltd., Suwon-si, Gyeonggi-do (KR)

(72) Inventor: Do-il Kwon, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 14/933,737

(22) Filed: Nov. 5, 2015

(65) Prior Publication Data

US 2016/0183046 A1 Jun. 23, 2016

(30) Foreign Application Priority Data

Dec. 17, 2014 (KR) .......................... 10-2014-0182701

(51) Int. Cl.
*H04W 4/02* (2018.01)
*H04W 4/80* (2018.01)
*H04W 76/23* (2018.01)
*H04B 17/318* (2015.01)

(52) U.S. Cl.
CPC .............. *H04W 4/02* (2013.01); *H04W 4/80* (2018.02); *H04B 17/318* (2015.01); *H04W 76/23* (2018.02)

(58) Field of Classification Search
CPC ......... H04W 4/02; H04W 4/00; H04W 4/023; H04W 64/00; H04W 76/023
See application file for complete search history.

(56) References Cited

U.S. PATENT DOCUMENTS

| | | | |
|---|---|---|---|
| 7,848,704 B2 | 12/2010 | Smith | |
| 8,023,895 B2 | 9/2011 | Smith | |
| 8,688,406 B2 | 4/2014 | Vock et al. | |
| 2011/0021147 A1 | 1/2011 | Tout | |
| 2011/0059769 A1* | 3/2011 | Brunolli ................. | G08C 17/02 455/556.1 |
| 2014/0031066 A1 | 1/2014 | Ortiz et al. | |
| 2014/0162701 A1 | 6/2014 | Jellinek et al. | |
| 2014/0179349 A1 | 6/2014 | Vuori | |

(Continued)

FOREIGN PATENT DOCUMENTS

KR 10-2009-0024327 A 3/2009
WO 2014/042507 A1 3/2014

*Primary Examiner* — Charles Appiah
*Assistant Examiner* — Margaret G Mastrodonato
(74) *Attorney, Agent, or Firm* — Jefferson IP Law, LLP

(57) ABSTRACT

A portable apparatus and a method of controlling location information of the portable apparatus are provided. A portable apparatus and a method of controlling location information of the portable apparatus for enabling location information of the portable apparatus corresponding to a connection termination time to be transmitted to a wearable apparatus when a connection between the portable apparatus and the wearable apparatus is terminated are provided. A portable apparatus and a method of controlling location information of the portable apparatus for enabling the portable apparatus to transmit location information of a termination time at which a first wireless connection is terminated to a wearable apparatus through a second wireless connection when the first wireless connection between the portable apparatus and the wearable apparatus is terminated are provided.

20 Claims, 17 Drawing Sheets

(56) References Cited

U.S. PATENT DOCUMENTS

2015/0148066 A1* 5/2015 Gilberton .............. H04W 4/023
　　　　　　　　　　　　　　　　　　　　455/456.1
2016/0057268 A1* 2/2016 Jiang ........................ H04B 5/00
　　　　　　　　　　　　　　　　　　　　455/556.1

* cited by examiner

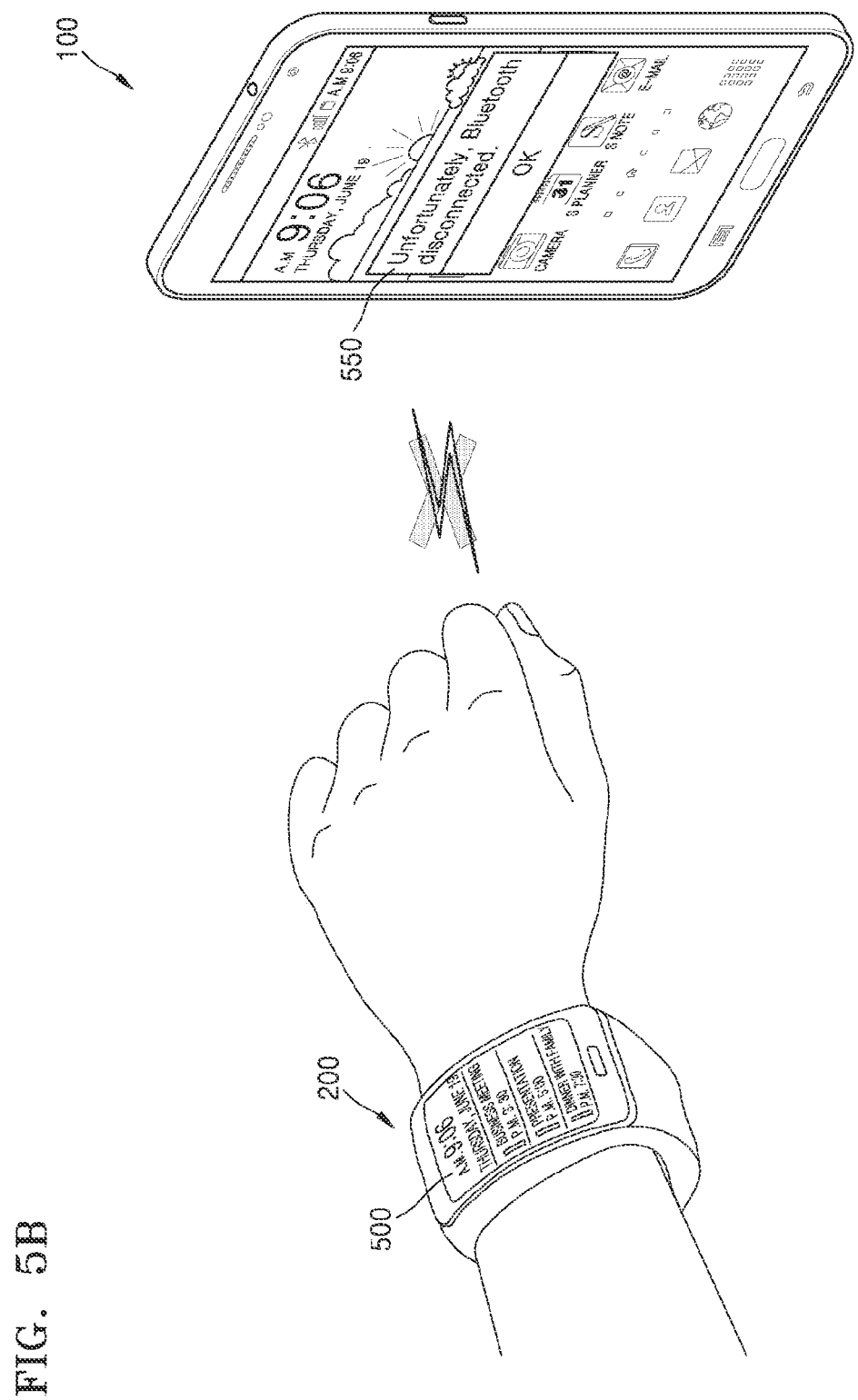

PORTABLE APPARATUS AND METHOD OF CONTROLLING LOCATION INFORMATION OF PORTABLE APPARATUS

CROSS-REFERENCE TO RELATED APPLICATION(S)

This application claims the benefit under 35 U.S.C. § 119(a) of a Korean patent application filed on Dec. 17, 2014 in the Korean Intellectual Property Office and assigned Ser. No. 10-2014-0182701, the entire disclosure of which is hereby incorporated by reference.

TECHNICAL FIELD

The present disclosure relates to a portable apparatus and a method of controlling location information of the portable apparatus. More particularly, the present disclosure relates to a portable apparatus and a method of controlling location information of the portable apparatus for enabling location information of the portable apparatus corresponding to a connection termination time to be transmitted to a wearable apparatus when a connection between the portable apparatus and the wearable apparatus is terminated.

BACKGROUND

Recently, various services and functions capable of being provided by a portable apparatus have been extended. In addition, the number of opportunities to connect a portable apparatus to various electronic apparatuses including a wearable apparatus by wire or wirelessly has increased.

As the use time of a portable apparatus increases, the likelihood of the portable apparatus being lost also increases. When a user recognizes the loss of a portable apparatus within 1 to 2 minutes, the user is likely to find the portable apparatus. However, when the loss time of a portable apparatus exceeds a given time (for example, 30 minutes), the portable apparatus is unlikely to be found. In addition, when the loss time of the portable apparatus exceeds the given time (for example, 30 minutes), it may be more difficult to estimate a position at which the portable apparatus was lost.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a portable apparatus and a method of controlling location information of the portable apparatus.

In accordance with an aspect of the present disclosure, a method of controlling location information of a portable apparatus is provided. The method includes establishing a connection to a wearable apparatus using first wireless communication, determining a termination of the connection between the portable apparatus and the wearable apparatus, externally receiving a signal corresponding to a location of the portable apparatus at a connection termination time at which the connection of the wearable apparatus is terminated, and transmitting location information representing the location of the portable apparatus to the wearable apparatus using second wireless communication, wherein the first wireless communication is short-range wireless communication.

In accordance with another aspect of the present disclosure, a portable apparatus is provided. The portable apparatus includes a first communication interface configured to establish a connection to a wearable apparatus, a second communication interface configured to establish a connection to the wearable apparatus, a global positioning system (GPS) receiver configured to receive a signal from a GPS satellite, and a controller configured to control the first communication interface, the second communication interface, and the GPS receiver, detect termination of the connection between the first communication interface and the wearable apparatus, calculate a location of the portable apparatus corresponding to a connection termination time at which the connection of the wearable apparatus is terminated by using a signal received through the GPS receiver, and transmit location information indicating the calculated location to the wearable apparatus through the second communication interface.

In accordance with another aspect of the present disclosure, a method of controlling location information of a wearable apparatus is provided. The method includes establishing a connection of first wireless communication to a portable apparatus, when the connection of the first wireless communication to the portable apparatus is terminated, receiving location information of the portable apparatus corresponding to a connection termination time from the portable apparatus through second wireless communication, and displaying the received location information on a screen.

Another aspect of the present disclosure is to provide a portable apparatus and a method of controlling location information of the portable apparatus for enabling location information corresponding to a connection termination time at which the connection of the portable apparatus is terminated to be transmitted to a wearable apparatus when a connection with the wearable apparatus is terminated.

Another aspect of the present disclosure is to provide a portable apparatus and a method of controlling location information of the portable apparatus for enabling location information corresponding to a connection termination time at which the connection of the portable apparatus is terminated to be transmitted to a wearable apparatus through second wireless communication when a connection of first wireless communication with the wearable apparatus is terminated.

Another aspect of the present disclosure is to provide a portable apparatus and a method of controlling location information of the portable apparatus for enabling location information regarding movement of the portable apparatus to be transmitted to a wearable apparatus when a connection between the portable apparatus and a wearable apparatus is terminated and the movement of the portable apparatus is detected.

Another aspect of the present disclosure is to provide a portable apparatus and a method of controlling location information of the portable apparatus for enabling at least one of piece of location information and remaining battery capacity information corresponding to a connection termination time at which the connection of the portable apparatus is terminated to be transmitted to the wearable apparatus when a connection between the portable apparatus and the wearable apparatus is terminated.

Another aspect of the present disclosure is to provide a portable apparatus and a method of controlling location information of the portable apparatus for enabling location information, remaining battery capacity information, and ringer mode information corresponding to a connection termination time at which the connection of the portable apparatus is terminated to be transmitted to the wearable apparatus when a connection between the portable apparatus and the wearable apparatus is terminated.

Another aspect of the present disclosure is to provide a portable apparatus and a method of controlling location information of the portable apparatus for enabling location information, remaining battery capacity information, and ringer mode information corresponding to a connection termination time at which the connection of the portable apparatus is terminated to be transmitted to the wearable apparatus when a connection between the portable apparatus and the wearable apparatus is terminated and movement of the portable apparatus is detected.

Another aspect of the present disclosure is to provide a portable apparatus and a method of controlling location information of the portable apparatus for enabling a change to a ringtone mode to be made according to a control command corresponding to a change of a ringer mode received from a wearable apparatus.

Another aspect of the present disclosure is to provide a portable apparatus and a method of controlling location information of the portable apparatus for enabling location information corresponding to a connection termination time at which the connection of the portable apparatus is terminated to be transmitted to a wearable apparatus when a connection between the portable apparatus and the wearable apparatus is terminated.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, 5C, 5D, and 5E are diagrams illustrating screen examples of a portable apparatus and a wearable apparatus according to various embodiments of the present disclosure.

Throughout the drawings, it should be noted that like reference numbers are used to depict the same or similar elements, features, and structures.

DETAILED DESCRIPTION

Figure 1:
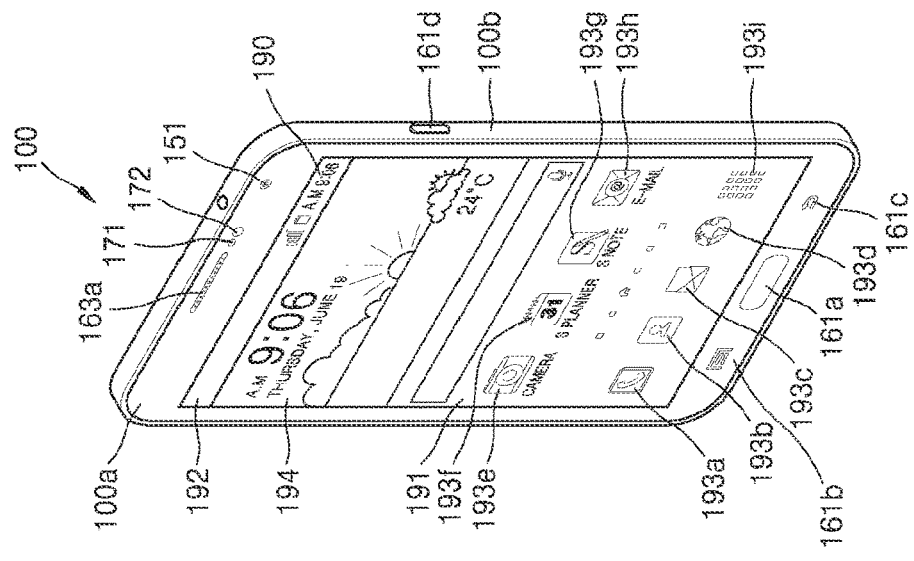
FIG. 1 is a schematic diagram illustrating a connection between a portable apparatus and a wearable apparatus according to an embodiment of the present disclosure.
Figure 1:
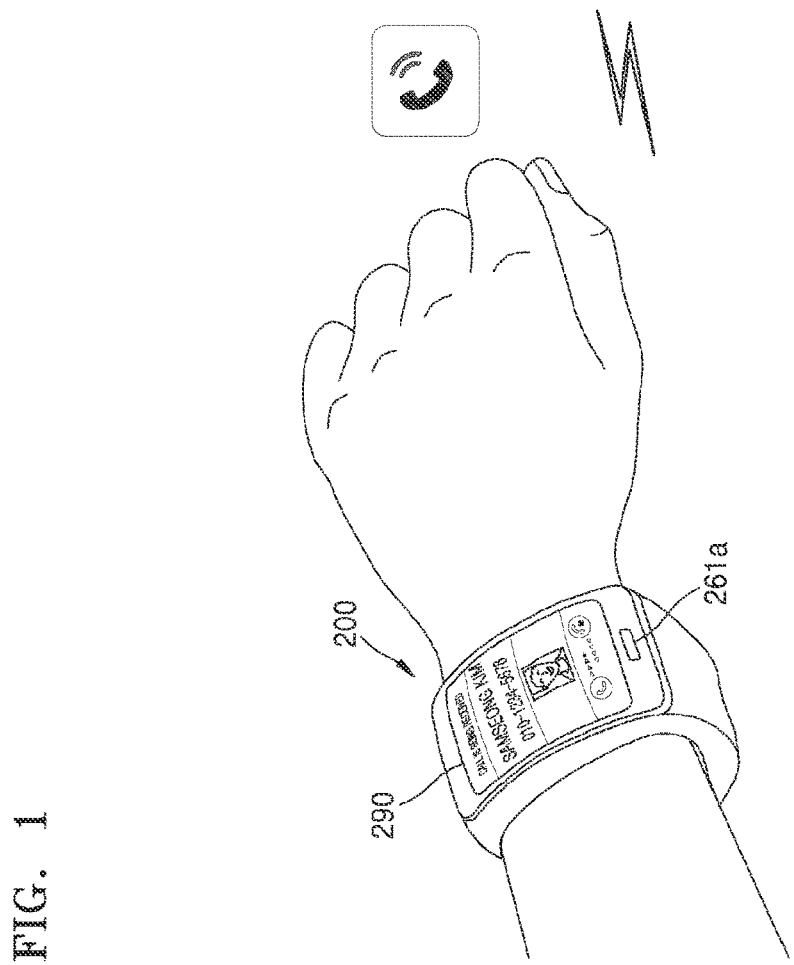

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

While such terms as "first," "second," etc., may be used to describe various components, such components are not limited by these terms. These terms are used only to distinguish one component from another. For example, a first element could be termed a second element, and a second element could be termed a first element, without departing from the scope of the present disclosure. Herein, the term "and/or" includes any and all combinations of one or more referents.

An application is software to be executed in an operating system (OS) for a computer or a mobile OS and available to a user. For example, the application may include a word processor, a spread sheet, an address book application, a calendar application, a memo application, an alarm application, a social network system (SNS) application, a chatting application, a map application, a music player, or a video player. The application according to various embodiments may be software to be executed in a portable apparatus or a wearable apparatus (for example, a server) connected to the portable apparatus wirelessly or by wire. In addition, the application according to various embodiments may be software to be executed in the portable apparatus in correspondence with an input received from the user.

In an embodiment, the wearable apparatus is an electronic apparatus capable of being mounted on a human body such as glasses or a watch and capable of interacting with the user. The wearable apparatus may detect biological information of the user (for example, blood pressure, a heart rate, a body temperature, brain waves, etc.) and information about the environment around the user (for example, a temperature, humidity, altitude, ultraviolet light, etc.). In addition, the wearable apparatus may have a touch screen and various sensors.

The content may be displayed in an application to be executed. For example, the content may include a video file or an audio file to be reproduced by the video player which is one of the applications, a music file to be reproduced by the music player, a photo file to be displayed in a photo gallery, a web page file to be displayed in a web browser, or the like. The content may include a video file, an audio file, a text file, an image file, or a web page to be displayed or executed in the application. In various embodiments of the present disclosure, the term "video" may be used to refer to a moving image. In addition, the content may include a video file, an audio file, a text file, an image file, or a web page to be executed in correspondence with an input (for example, a touch or the like) received from the user.

The content may include an application screen to be executed and a user interface constituting the application screen. In addition, the content may include one piece of content or a plurality of pieces of content.

A widget is a mini application which is one of graphic user interfaces (GUIs) for more smoothly supporting interaction between the user and the application or OS. For example, a widget may include weather widgets, calculator widgets, clock widgets, etc.

The terms used in the present specification are merely used to describe various embodiments, and are not intended to limit embodiments. An expression used in the singular encompasses the expression of the plural, unless the context clearly indicates otherwise. In the present disclosure, it is to be understood that terms such as "including," "having," and "comprising" are intended to indicate the presence of features, numbers, actions, components, parts, or combinations thereof disclosed in the specification, and are not intended to preclude the possibility that one or more other features, numbers, actions, components, parts, or combinations thereof are present or added. Like reference numerals in the drawings denote like elements which perform substantially the same functions.

Figure 2:
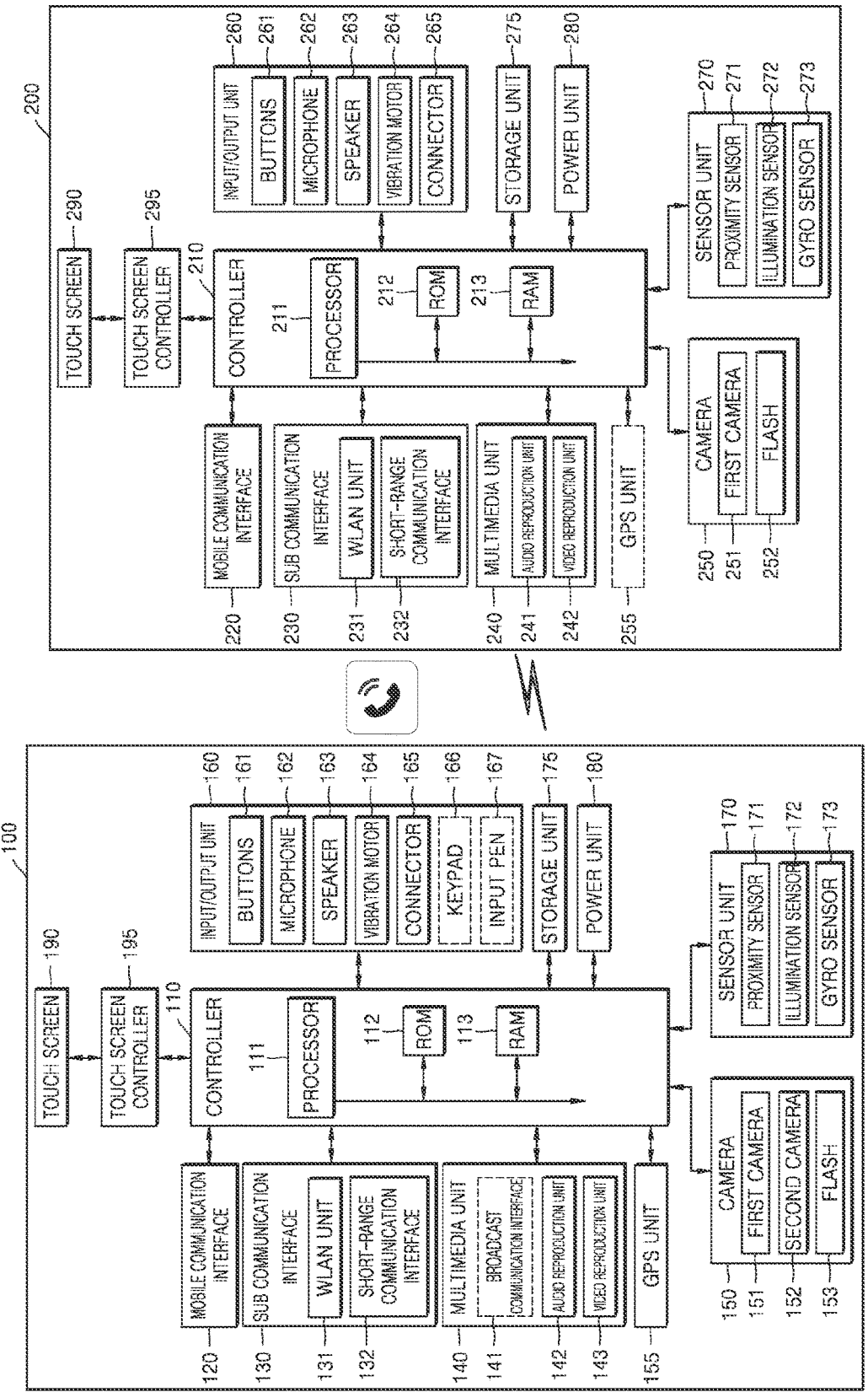
FIG. 2 is a schematic block diagram illustrating a portable apparatus and a wearable apparatus according to an embodiment of the present disclosure.

FIG. 1 is a schematic diagram illustrating a connection between a portable apparatus and a wearable apparatus according to an embodiment of the present disclosure. FIG. 2 is a schematic block diagram illustrating a portable apparatus and a wearable apparatus according to an embodiment of the present disclosure.

Referring to FIG. 1, the portable apparatus 100 and the wearable apparatus 200 may be wirelessly connected by using communication interfaces 120, 130, 220, and 230 (see FIG. 2). For example, the portable apparatus 100 and the wearable apparatus 200 may be connected in mobile communication, an ad-hoc mode, or an infra-structure mode in which a mutual wireless connection through an access point (AP) is established.

The wireless communication, for example, may be mobile communication including next generation communication as well as second, third, fourth, and fifth generation communication, a wireless local area network (WLAN), wireless fidelity (Wi-Fi), Bluetooth (BT), BT low energy, ZigBee, Wi-Fi direct (WFD), ultra wideband (UWB), infrared data association (IrDA), and near field communication (NFC)), or the like. The wireless communication is not limited thereto. In addition, the portable apparatus 100 and the wearable apparatus 200 may be connected by wire through a connector.

The portable apparatus 100 may wirelessly transmit content to be executed in applications (for example, corresponding to shortcut icons 193a to 193i) or a widget 194 of a home screen 191 distinguished from a status bar 192 to the wearable apparatus 200. The portable apparatus 100 may wirelessly control the wearable apparatus 200 through the applications or the widget.

Referring to FIGS. 1 and 2, the portable apparatus 100 may be connected to the wearable apparatus 200 by using the mobile communication interface 120, the sub communication interface 130, or a connector 165 by wire or wirelessly. The portable apparatus 100 may include a mobile phone (not illustrated), a smartphone (not illustrated), a Moving Picture Experts Group phase 1 or phase 2 (MPEG-1 or PMEG-2) audio layer 3 (MP3) player, a video player, a notebook personal computer (PC), a tablet PC, another wearable apparatus, an electronic board, or a display apparatus. The display apparatus, for example, may be implemented by a digital television (TV), a three-dimensional (3D) TV, a smart TV, a light-emitting diode (LED) TV, an organic LED (OLED) TV, a plasma TV, a monitor, an analog TV, a curved TV having a screen of fixed curvature, a flexible TV having a screen of fixed curvature, a bent TV having a screen of fixed curvature, and/or a variable curvature TV in which the current screen curvature may be changed by a user's input, but those skilled in the art will readily understand that the portable apparatus 100 is not limited thereto.

The portable apparatus 100 is an electronic apparatus having a touch screen and capable of externally transmitting or receiving data (or content) through the communication interface 120 or 130. The portable apparatus 100 is an electronic apparatus and may have an input pen and a touch screen and be capable of externally transmitting or receiving content (or data) through the communication interface 120 or 130. In addition, the portable apparatus 100 may include an electronic apparatus capable of externally transmitting or receiving content (or data) to or from the wearable apparatus 200 by using the interaction (for example, a touch or touch gesture) input to a touch screen 190. In addition, the portable apparatus 100 may be an apparatus having a display unit (for example, including only a display panel (not illustrated) without a touch panel) and capable of externally transmitting or receiving content (or data) through the communication interface 120 or 130. The portable apparatus 100 may have two or more touch screens. In addition, the portable apparatus 100 may have a plurality of screens into which one touch screen is divided.

The portable apparatus 100 includes a controller 110, the mobile communication interface 120, the sub communication interface 130, a multimedia unit 140, a camera 150, a global positioning unit (GPS) unit 155, an input/output unit 160, a sensor unit 170, a storage unit 175, and a power unit 180. The portable apparatus 100 includes the touch screen 190 and a touch screen controller 195.

The controller 110 may include a processor 111, a read only memory (ROM) 112 configured to store a control program for controlling the portable apparatus 100, and a random access memory (RAM) 113 configured to store a signal or data input from outside the portable apparatus 100 or used as a storage region corresponding to various tasks to be performed in the portable apparatus 100. Further, controller 110 may be an ARM (Advanced RISC Machine) processor such as the SNAPDRAGON BY QUALCOMM CPU.

The controller 110 controls the overall operation of the portable apparatus 100 and a signal flow between the internal components 120 to 195 of the portable apparatus 100 and performs a function of processing data. The controller 110 controls power to be supplied to the internal components 120 to 195 by using the power unit 180. In addition, when the user's input is present or a set condition is satisfied, the controller 110 may execute the sensor of the sensor unit 170 and the OS or applications stored in the storage unit 175.

The processor 111 may include a graphics processing unit (GPU) (not illustrated) for graphics processing. The processor 111 may be implemented in the form of a system on chip (SoC) including a core (not illustrated) and the GPU (not illustrated). The processor 111 may include a single core, a dual core, a triple core, a quad core, etc. In addition, the processor 111, the ROM 112, and the RAM 113 may be mutually connected through a bus. Further, the processor 111 may be an ARM (Advanced RISC Machine) processor such as the SNAPDRAGON BY QUALCOMM CPU.

The controller 110 according to various embodiments performs control so that a connection to the wearable apparatus 200 is established by using first wireless communication, termination of the connection of the first wireless communication with the wearable apparatus 200 is determined, a signal corresponding to a location of a connection termination time of the wearable apparatus 200 is externally received, and location information corresponding to the connection termination time is transmitted to the wearable apparatus 200 by using second wireless communication. The first wireless communication may include wireless communication having a limited transmission distance.

The first wireless communication is performed by an interface which is selected among the mobile communication interface 120, the WLAN unit 131 and the short-range communication interface 132. Further, the second wireless communication is performed by another interface among the mobile communication interface 120, the WLAN unit 131 and the short-range communication interface 132. Further, the wireless communication, for example, may be mobile communication including next generation communication as well as second, third, fourth, and fifth generation communication, a wireless local area network (WLAN), wireless fidelity (Wi-Fi), Bluetooth (BT), BT low energy, ZigBee, Wi-Fi direct (WFD), ultra wideband (UWB), infrared data association (IrDA), and near field communication (NFC)), or the like.

When the above-described signal is received, the controller 110 may control at least one of an outdoor location and an indoor location of the portable apparatus 100 to be calculated by using a signal received from the GPS satellite or the wireless AP.

The controller 110 may control the movement of the portable apparatus 100 to be detected by using the sensor and control the location movement information calculated in correspondence with the movement of the portable apparatus 100 to be transmitted to the above-described wearable apparatus by using the second wireless communication.

The controller 110 may control the remaining battery capacity of the portable apparatus to be detected.

The controller 110 may control one of ringer modes of the portable apparatus 100 to be determined. The ringer modes serving as modes corresponding to alarm outputs of the portable apparatus 100, for example, may include a ringtone mode, a silent mode, and a vibration mode.

The controller 110 may control the remaining battery capacity information and the ringer mode information to be transmitted to the wearable apparatus 200 using the second wireless communication.

The controller 110 may control a control command corresponding to change of a ringer mode to be received from the wearable apparatus 200 and control the portable apparatus 100 to change the mode to the ringtone mode in correspondence with the received control command.

The controller 110 may control a ringtone to be output through a speaker according to the ringtone mode to which the mode changes in correspondence with the received control command.

The controller 110 may control at least one of visual, auditory, and haptic feedback to be provided in correspondence with termination of the connection of the first wireless communication with the wearable apparatus 200.

In various embodiments of the present disclosure, the term "controller of the portable apparatus 100" includes the processor 111, the ROM 112, and the RAM 113.

The mobile communication interface 120 may establish a connection to the wearable apparatus 200 through a mobile communication network using one or more antennas according to control of the controller 110. The mobile communication interface 120 may transmit/receive a radio signal for voice communication, image communication, text message communication (short message service (SMS)), multimedia message communication (multimedia message service (MMS)), and data communication to/from the wearable apparatus 200 having a connectable phone number, a mobile phone (not illustrated), a smartphone (not illustrated), a tablet PC, a tablet apparatus, or another portable apparatus (not illustrated).

The sub communication interface 130 may include a WLAN unit 131, a short-range communication interface 132, or both the WLAN unit 131 and the short-range communication interface 132.

The WLAN unit 131 may wirelessly connect to an AP according to control of the controller 110. The WLAN unit 131 supports a WLAN standard (IEEE 802.11x). The short-range communication interface 132 may wirelessly perform short-range communication with the wearable apparatus 200 without an AP according to control of the controller 110. The short-range communication, for example, may include BT, BT low energy, IrDA, Wi-Fi, UWB, NFC, etc.

The portable apparatus 100 may include at least one of the mobile communication interface 120, the WLAN unit 131, and the short-range communication interface 132 according to performance. For example, the portable apparatus 100 may include the mobile communication interface 120, the WLAN unit 131, the short-range communication interface 132, or a combination of the mobile communication interface 120, the WLAN unit 131, and the short-range communication interface 132. The portable apparatus 100 may be connected to an external accessory (for example, a wireless speaker, a wireless headset, or the like) by using one of the mobile communication interface 120 and the sub communication interface 130.

In various embodiments, the term "communication interface" includes the mobile communication interface 120 and the sub communication interface 130.

The multimedia unit 140 may include a broadcast receiver 141, an audio reproduction unit 142, or a video reproduction unit 143. The broadcast receiver 141 may receive a broadcast signal (for example, a TV broadcast signal, a radio broadcast signal, or a data broadcast signal) and additional broadcast information (for example, an electronic program guide (EPS) or an electronic service guide (ESG)) transmitted from an external broadcasting station through an antenna (not illustrated) according to control of the controller 110. The controller 110 may reproduce the received broadcast signal and additional broadcast information by using a touch screen, a video codec (not illustrated) and an audio codec (not illustrated).

The audio reproduction unit 142 may reproduce an audio source (for example, an audio file having a file extension of mp3, wma, ogg, or way) pre-stored in the storage unit 175 of the portable apparatus 100 or externally received by using the audio codec according to control of the controller 110.

According to various embodiments, the audio reproduction unit 142 may reproduce auditory feedback (for example, an output of an audio source stored in the storage unit) corresponding to the transmission of location information through the audio codec according to control of the controller 110. According to various embodiments of the present disclosure, the audio reproduction unit 142 may reproduce auditory feedback (for example, an output of an audio source stored in the storage unit) corresponding to the transmission of movement information through the audio codec according to control of the controller 110.

The video reproduction unit 143 may reproduce a digital moving-image source (for example, a video file having a file extension of mpeg, mpg, mp4, avi, mov, or mkv) pre-stored in the storage unit 175 of the portable apparatus 100 or externally received by using a video codec according to control of the controller 110. A multimedia application capable of being installed in the portable apparatus 100 may reproduce an audio source or a video source by using the audio codec or the video codec. In addition, a multimedia application capable of being installed in the portable apparatus 100 may reproduce a video source by using a hardware codec (not illustrated) and/or a software codec (not illustrated).

According to various embodiments, the video reproduction unit 143 may reproduce visual feedback (for example, an output of a video source stored in the storage unit) corresponding to the transmission of location information through the video codec according to control of the controller 110. According to various embodiments, the video reproduction unit 143 may reproduce visual feedback (for example, an output of a video source stored in the storage unit) corresponding to the transmission of movement information through the video codec according to control of the controller 110.

Those skilled in the art will readily understand that various types of video codecs and audio codecs capable of reproducing audio/video files having various file extensions are produced and sold.

The multimedia unit 140 may include the audio reproduction unit 142 and the video reproduction unit 143 without the broadcast receiver 141 in correspondence with the performance or structure of the portable apparatus 100. In addition, the controller 110 may include the audio reproduction unit 142 or the video reproduction unit 143 of the multimedia unit 140.

In various embodiments, the term "audio codec" may include one or two or more audio codecs. In various embodiments, the term "video codec" may include one or two or more video codecs.

The camera 150 may include at least one of a first camera 151 of a front surface 100a and a second camera 152 of a rear surface (not illustrated) for capturing a still image or a moving image according to control of the controller 110. For example, the camera 150 may include the first camera 151, the second camera 152, or both the first camera 151 and the second camera 152.

The first camera 151 or the second camera 152 may include an auxiliary light source (for example, a flash 153) for providing a light intensity necessary for capturing an image.

The controller 110 may capture a 3D still image or a 3D moving image using the first camera 151 of the front surface and an additional camera (for example, a third camera (not illustrated)) (having a distance greater than about 30 mm and less than about 80 mm from the first camera 151) located adjacent to the first camera 151. In addition, the controller 110 may capture a 3D still image or a 3D moving image using the second camera 152 of the rear surface and an additional camera (for example, a fourth camera (not illustrated)) (having a distance greater than about 30 mm and less than about 80 mm from the second camera 152) located adjacent to the second camera 152. In addition, the cameras 151 and 152 may perform wide-angle, telescopic, and close-up shooting using an additional lens (not illustrated) detachable from a separate adapter (not illustrated).

The GPS unit 155 periodically receives signals (for example, orbital information of a GPS satellite, satellite time information, a navigation message, etc.) from a plurality of GPS satellites 156 (see FIG. 5C) orbiting the earth. When used outdoors, the portable apparatus 100 may calculate locations of the portable apparatus 100 and a plurality of GPS satellites 156a to 156d using signals received from the plurality of GPS satellites 156a to 156d, and calculate a distance using a transmission/reception time difference. Through triangulation, a location, time, or movement speed of the portable apparatus 100 may be calculated. An additional GPS satellite may be necessary for orbit correction or time correction. Even when used indoors where signals are received from the plurality of GPS satellites 156 through the GPS unit 155, the portable apparatus 100 may calculate the location, time, or movement speed of the portable apparatus 100.

When used indoors, the portable apparatus 100 may detect the location or movement speed of the portable apparatus 100 using a wireless AP (not illustrated). When the location of the portable apparatus 100 is detected indoors, it is possible to use a cell-identification (ID) scheme using an ID of the wireless AP, an enhanced cell-ID scheme using an ID of a wireless AP and a received signal strength (RSS), or an angle of arrival (AoA) scheme using an angle at which the portable apparatus 100 receives a signal transmitted from the AP.

In addition, the portable apparatus 100 may detect the location or movement speed of the portable apparatus 100 located indoors using a radio beacon (not illustrated). Those skilled in the art will readily understand that an indoor location of the portable apparatus 100 may be detected through various schemes as well as the above-described scheme.

In various embodiments, the controller 110 may calculate the outdoor location using the GPS unit 155 or the indoor location using the wireless AP. The controller 110 may store the calculated outdoor or indoor location in the storage unit.

The input/output unit 160 may include at least one of buttons 161, a microphone 162, a speaker 163, a vibration motor 164, the connector 165, a keypad 166, and an input pen 167.

Referring to FIGS. 1 and 2, the buttons 161 include a home button 161a, a menu button 161b, and a return button 161c located in a lower portion of the front surface 100a of the portable apparatus 100. The buttons 161 may include a power/lock button 161d and one or more volume buttons (not shown) in a side surface 100b of the portable apparatus 100. In addition, the buttons 161 of the portable apparatus 100 may include only the home button 161a, the power/lock button 161d, and the volume buttons. The buttons 161 of the portable apparatus 100 may be implemented as touch buttons outside the touch screen 190 as well as physical buttons.

In addition, the buttons 161 of the portable apparatus 100 may be displayed in the form of text, an image, or an icon on the touch screen 190.

The microphone 162 receives an external voice or sound to generate an electrical signal according to control of the controller 110. The electrical signal generated from the microphone 162 is converted by an audio codec and the converted signal may be stored in the storage unit 175 or output through the speaker 163. Referring to FIGS. 1 and 2, one or more microphones 162 may be located in the front surface 100a, the side surface 100b, and the rear surface of the portable apparatus 100. In addition, one or more microphones 162 may be located only in the side surface 100b of the portable apparatus 100.

The speaker 163 may output sounds corresponding to various signals (for example, a radio signal, a broadcast signal, an audio source, a video file, an image capturing signal, etc.) of the mobile communication interface 120, the sub communication interface 130, the multimedia unit 140, and the camera 150 outside the portable apparatus 100 using the audio codec according to control of the controller 110.

The speaker 163 may output a sound (for example, a touch operation sound corresponding to a phone number input or an image capturing button operation sound) corresponding to a function to be performed by the portable apparatus 100.

Referring to FIGS. 1 and 2, one or more speakers 163 may be located in the front surface 100a, the side surface 100b, and the rear surface of the portable apparatus 100. A plurality of speakers (e.g., 163a) may be located in the front surface 100a of the portable apparatus 100. In addition, the speakers may be located in the front surface 100a and the rear surface. One speaker 163a may be located in the front surface 100a of the portable apparatus 100 and one speaker and an additional speaker (not illustrated) may be located in the rear surface of the portable apparatus 100. In addition, the speakers may be located in the side surface 100b. The portable apparatus 100 having the additional speaker located in the side surface 100b may provide the user with a different sound effect from a portable apparatus (not illustrated) having the speakers located in the front surface 100a and the rear surface.

According to various embodiments, the speaker 163 may output auditory feedback in correspondence with transmission of location information corresponding to a connection termination location of the portable apparatus 100 according to control of the controller 110.

The vibration motor 164 may convert an electrical signal into mechanical vibration according to control of the controller 110. The vibration motor 164 may include a linear vibration motor, a bar type vibration motor, a coin type vibration motor, or a piezoelectric vibration motor. For example, when voice communication from another portable apparatus (not illustrated) is requested, the vibration motor 164 of the portable apparatus 100 in a vibration mode may operate (for example, vibrate) according to control of the controller 110. One or more vibration motors 164 may be located in the portable apparatus 100. In addition, the vibration motor 164 may vibrate the entire portable apparatus 100 or vibrate only part of the portable apparatus 100.

According to various embodiments, the vibration motor 164 may output haptic feedback in correspondence with transmission of location information corresponding to the connection termination location of the portable apparatus 100 according to control of the controller 110. In addition, the vibration motor 164 may provide various types of haptic feedback (for example, various intensities and durations of vibration) which are pre-stored or externally received according to a control command of the controller 110.

The connector 165 may be used as an interface for connecting the portable apparatus 100 and the wearable apparatus 200 or the portable apparatus 100 and a power source (not illustrated) by wire. According to control of the controller 110, the portable apparatus 100 may transmit data stored in the storage unit 175 to the wearable apparatus 200 or receive data from a wearable apparatus (not illustrated) through a wired cable connected to the connector 165. The portable apparatus 100 may receive the supply of electric power from the power source (not illustrated) or charge a battery (not illustrated) through the wired cable connected to the connector 165. In addition, the portable apparatus 100 may be connected to an external accessory (for example, a speaker (not illustrated) or a keyboard dock (not illustrated) through the connector 165.

The keypad 166 may receive a key input from the user for control of the portable apparatus 100 and an input of a phone number or a message. The keypad 166 includes a physical keypad (not illustrated) formed in the front surface 100a of the portable apparatus 100, a virtual keypad (not illustrated) displayed within the touch screen 190, or a physical keypad (not illustrated) connectable wirelessly or by wire. Those skilled in the art will readily understand that the physical keypad (not illustrated) formed in the front surface 100a of the portable apparatus 100 may be omitted according to the performance or structure of the portable apparatus 100.

Referring to FIGS. 1 and 2, the input pen 167 may touch or select an object (for example, a menu, text, an image, a video, a graphic, an icon, or a shortcut icon) displayed (or configured) on the home screen 191 of the touch screen 190 or a handwriting/drawing application (for example, memo, note, sketch, etc.) of the portable apparatus 100.

The input pen 167 may touch or select content (for example, a text file, an image file, an audio file, a video file, or a web page) displayed on the touch screen 190 or the handwriting/drawing application (for example, memo, note, sketch, etc.) of the portable apparatus 100. In addition, the input pen 167 may perform handwriting, drawing, painting, or sketching on the screen of a handwriting application (for example, memo, etc.) or the screen of a drawing application (for example, sketch, etc.) displayed on the touch screen 190 of the portable apparatus 100.

The input pen 167 may input a character, etc. by touching a touch screen of a capacitive type, a resistive type, or an electromagnetic resonance (EMR) type or using the displayed virtual keypad. The input pen 167 may include a stylus pen or a haptic pen (not illustrated) in which an embedded vibration element (for example, an actuator or a vibration motor) vibrates. In addition, the input pen 167 may operate (vibrate) a vibration element in correspondence with sensing information detected by the sensor (for example, an acceleration sensor (not illustrated)) embedded in the input pen 167 as well as control information received from the portable apparatus 100.

When the input pen 167 is drawn from an insertion opening (not illustrated), the controller 110 may display the screen (not illustrated) of the handwriting/drawing application on the touch screen 190 after executing the set handwriting/drawing application.

When the handwriting or drawing is input by the user's finger in the application displayed on the capacitive type touch screen or the resistive type touch screen, the controller 110 may detect the touch of one of the fingers including the thumb using the touch screen 190 and the touch screen controller 195.

Those skilled in the art will readily understand that shapes (for example, a circular cross section or a polygonal cross section) or structures of the insertion opening (not illustrated) and the input pen 167 of the portable apparatus 100 may change according to performance or a structure of the portable apparatus 100.

The sensor unit 170 includes at least one sensor for detecting the state of the portable apparatus 100. For example, the sensor unit 170 may include a proximity sensor 171 for detecting proximity to an electronic apparatus serving as the portable apparatus 100 of the user, an illumination sensor 172 for detecting an intensity of light around the portable apparatus 100, and a gyro sensor 173 for detecting a direction using the rotational inertia of the portable apparatus 100. In addition, the sensor unit 170 may include an acceleration sensor (not illustrated) for detecting acceleration along three axes (for example, x, y, and z axes) applied to the portable apparatus 100, a gravity sensor for detecting a direction of gravity action, or an altimeter for detecting an altitude by measuring an atmospheric pressure.

The sensor unit 170 may measure motion acceleration and gravity acceleration of the portable apparatus 100. In the fixed portable apparatus 100, the sensor unit 170 may detect only the gravity acceleration. For example, the gravity acceleration may be in a positive (+) direction when the front surface 100a of the portable apparatus 100 is upward and the gravity acceleration may be in a negative (−) direction when the rear surface of the portable apparatus 100 is downward. In addition, the sensor unit 170 may further include a fingerprint sensor (not illustrated) for detecting the user's fingerprint, an infrared sensor (not illustrated) for detecting surrounding infrared light, or a heart rate sensor (not illustrated) for detecting the user's heart rate.

The sensor included in the sensor unit 170 detects the state of the portable apparatus 100 and transmits an electric signal corresponding to the detection to the controller 110. Those skilled in the art will readily understand that the sensor included in the sensor unit 170 may be added or omitted according to performance of the portable apparatus 100.

According to control of the controller 110, the storage unit 175 may store signals or data to be input/output in correspondence with operations of the multimedia unit 140, the camera 150, the GPS unit 155, the input/output unit 160, the sensor unit 170, and the touch screen 190. The storage unit 175 may store a GUI related to a control program for the portable apparatus 100 or control of the controller 110 and an application initially provided by a manufacturer or externally downloaded, images for providing the GUI, user information, documents, databases (DBs), or related data.

The storage unit 175 according to various embodiments may store apparatus information about the portable apparatus 100 and apparatus information about the wearable apparatus 200.

The storage unit 175 may store a received signal strength indication/indicator (RSSI) value range table, a calculated RSSI value, or a threshold RSSI value.

The storage unit 175 may store at least one BT profile and store a normal connection termination signal and/or an abnormal connection termination signal between the portable apparatus 100 and the wearable apparatus 200.

The storage unit 175 may store location information (for example, outdoor location information, indoor location information, or outdoor location movement information) calculated through reception from the GPS satellite or location information (for example, indoor location information or indoor location movement information) calculated through reception from the wireless AP.

The storage unit 175 may store state information corresponding to movement of the portable apparatus 100 or fixation of the portable apparatus 100 detected through the sensor.

The storage unit 175 may store information representing a calculated remaining battery capacity of the portable apparatus 100 or ringer mode information of the portable apparatus 100.

The storage unit 175 may store a control packet corresponding to a ringer mode change request received from the wearable apparatus 200.

The storage unit 175 may store a changed ringer mode in correspondence with the received control packet.

The storage unit 175 may store visual feedback (for example, a video source or the like) recognizable by the user output to the touch screen 190, auditory feedback (for example, a sound source or the like) recognizable by the user output from the speaker 163, and haptic feedback (for example, a haptic pattern or the like) recognizable by the user output from the vibration motor 164 in correspondence with transmission of the location information, the location movement information, the remaining battery capacity information, and the ringer mode information.

The storage unit 175 may store a feedback providing time (for example, 300 msec) of the feedback to be provided to the user.

In various embodiments of the present disclosure, the term "storage unit" includes the storage unit 175, the ROM 112 or the RAM 113 within the controller 110, or a memory card (not illustrated) (for example, a micro secure digital (SD) card or a memory stick) mounted in the portable apparatus 100. In addition, the storage unit may include a nonvolatile memory, a volatile memory, a hard disk drive (HDD), or a solid state drive (SSD).

The power unit 180 may supply electric power to any or all of the components 120 to 175 located inside the portable apparatus 100 according to control of the controller 110. The power unit 180 may supply the portable apparatus 100 with electric power input from an external power source (not illustrated) through a wired cable (not illustrated) connected to the connector 165 according to control of the controller 110. In addition, the power unit 180 may charge one or more batteries (not illustrated) by supplying electric power to the one or more batteries (not illustrated) according to control of the controller 110. The one or more batteries (not illustrated) may be located between the touch screen 190 located in the front surface 100a and the rear surface.

When the battery of the portable apparatus 100 is a lithium ion battery, the controller 110 may prevent overcharge, over-discharge, over-current, or short-circuit of the battery using a battery protection circuit module (not illustrated). In addition, when the battery of the portable apparatus 100 is a lithium polymer battery of a gel state having higher viscosity than the lithium ion battery, the portable apparatus 100 may use a simpler battery protection circuit than in the case of the lithium ion battery. The battery protection circuit may be included in the power unit 180 or implemented in the battery (not illustrated).

A detector (not illustrated) constituted of a circuit including a resistor may detect power consumption of the battery (for example, a physical battery) using a voltage (or current). The detector (not illustrated) may be constituted of a resistor or an amplifier. The detector (not illustrated) may include the battery protection circuit or may be implemented separately from the battery protection circuit.

The controller 110 may calculate battery power consumption, a remaining battery capacity, and an available time of the portable apparatus 100 using the voltage (or current) detected by the detector (not illustrated). When the connection between the portable apparatus 100 and the wearable apparatus 200 is terminated, the controller 110 may calculate the battery power consumption, the remaining battery capacity, and the available time of the portable apparatus 100 using the detector (not illustrated).

When the connection between the portable apparatus 100 and the wearable apparatus 200 is terminated, the controller 110 may reduce the battery power consumption by switching the battery to a battery power-saving mode (for example, application termination, display brightness adjustment, or the like). The controller 110 may be configured to operate the portable apparatus 100 for a relatively long time through the battery power-saving mode.

The power unit 180 may wirelessly charge one or more batteries (not illustrated) according to control of the controller 110 (for example, a self-resonance scheme, an electromagnetic scheme, and a self-induction scheme).

The touch screen 190 includes a touch panel (not illustrated) for receiving a touch input and a display panel (not illustrated) for displaying a screen. The touch screen 190 may provide the user with GUIs corresponding to various services (for example, voice communication, video communication, data transmission, broadcast reception, image capturing, video view, and application execution). The touch screen 190 transmits an analog signal corresponding to a single touch or a multi-touch input through the home screen 191 or the GUI to the touch screen controller 195. The touch screen 190 may receive the input of the single touch or the multi-touch through the user's body (for example, fingers including the thumb) or the input pen 167.

The display panel (not illustrated) includes a plurality of pixels and displays an image through the pixels. For example, the display panel (not illustrated) includes a display panel of a liquid crystal display (LCD) scheme, an OLED scheme, an LED scheme, or the like. The display panel (not illustrated) may display various images and a plurality of objects according to various operation states, applications, or service execution of the portable apparatus 100.

In various embodiments, the touch includes a non-contact touch as well as contact of the user's body or the input pen 167 with the touch screen 190. For example, the non-contact touch may include hovering in which a distance between the touch screen 190 and the user's body or the input pen 167 is less than or equal to about 50 mm. Those skilled in the art will readily understand that a non-touch distance in which detection is possible in the touch screen 190 may change according to the performance and structure of the portable apparatus 100.

The touch screen 190, for example, may be implemented in a resistive type, a capacitive type, an infrared type, or an acoustic wave type.

The touch screen 190 may include an EMR touch screen. The EMR touch screen further includes a separate EMR touch panel (not illustrated) for receiving an input of an input pen (not illustrated) having a resonance circuit in an EMR type loop coil.

The touch screen 190 according to various embodiments may display visual feedback in correspondence with the connection terminal location of the portable apparatus 100 according to control of the controller 110.

The touch screen controller 195 converts an analog signal corresponding to the single touch or the multi-touch received from the touch screen 190 into a digital signal and transmits the digital signal to the controller 110. The controller 110 may calculate X and Y coordinates corresponding to a touch position on the touch screen 190 using the digital signal received from the touch screen controller 195.

The controller 110 may control the touch screen 190 using the digital signal received from the touch screen controller 195. For example, in response to an input touch, the controller 110 may display a shortcut icon (for example, denoted by reference sign 193*a* of FIG. 1) on the touch screen 190 to be distinguished from other icons (for example, denoted by reference signs 193*b* to 193*h*) or display an application screen on the touch screen 190 after executing an application (for example, phone communication) corresponding to a selected shortcut icon (denoted by reference sign 193*a* of FIG. 1).

The touch screen controller 195 may be implemented as one or more touch screen controllers 195. The touch screen controller 195 may be included in the controller 110 in correspondence with the performance or structure of the portable apparatus 100.

The touch screen controller 195 converts an analog signal corresponding to a touch received from an EMR type touch screen separate from an analog signal corresponding to the single touch or the multi-touch received from the touch screen 190 into a digital signal and transmits the digital signal to the controller 110. The controller 110 may calculate X and Y coordinates corresponding to a touch position on the EMR type touch screen using the digital signal received from the touch screen controller 195. In the case of the EMR type touch screen, an EMR type touch screen controller (not illustrated) may be used.

Although the portable apparatus 100 illustrated in FIGS. 1 and 2 has one touch screen, a plurality of touch screens may be provided. A plurality of touch screens are located in separate housings (not illustrated), and the housings (not illustrated) may be mutually connected by a hinge (not illustrated). In addition, a plurality of touch screens (or a plurality of flexible touch screens) may be located in one housing (not illustrated). Each of the plurality of touch screens (or the plurality of flexible touch screens) may be configured to include one display panel (one flexible display panel) and a plurality of touch panels (or a plurality of flexible touch panels).

Those skilled in the art will readily understand that, in terms of the components of the portable apparatus 100 illustrated in FIG. 2, at least one component may be added or omitted in correspondence with performance of the portable apparatus 100.

The wearable apparatus 200 may be connected to the portable apparatus 100 and another wearable apparatus or server by wire or wirelessly using the communication interfaces 220 and 230.

The wearable apparatus 200 is an electronic apparatus which may be worn on the human body and interact with the user. The wearable apparatus 200 may include an accessory type wearable apparatus such as a watch, glasses, and a band, a wearable apparatus integrated with the fabric of a garment such as shoes or a smart garment, a wearable apparatus attachable to a human body such as a sensor mounted on a skin, or a wearable apparatus implantable inside a living body. The wearable apparatus 200 is an apparatus which may detect an internal or external state of the wearable apparatus 200 using a sensor unit 270 and transmit information about the detected state to the portable apparatus 100 or the server (not illustrated) through the communication interface 220 or 230.

The wearable apparatus 200 includes a controller 210, the communication interfaces 220 and 230, a multimedia unit 240, a camera 250, a GPS unit 255, an input/output unit 260, the sensor unit 270, a storage unit 275, a power unit 280, a touch screen 290, and a touch screen controller 295.

The controller 210 may include a processor 211, a ROM 212 configured to store a control program for controlling the wearable apparatus 200, and a RAM 213 configured to store a signal or data input from outside the wearable apparatus 200 or used as a storage region for various tasks to be performed in the wearable apparatus 200. Further, controller 210 may be an ARM (Advanced RISC Machine) processor such as the SNAPDRAGON BY QUALCOMM CPU.

The controller 210 controls the overall operation of the wearable apparatus 200 and a signal flow between the internal components 220 to 290 of the wearable apparatus 200 and performs a function of processing data. The controller 210 controls electric power to be supplied from the power unit 280 to the internal components 220 to 290. In addition, when an input of the user is present or a preset stored condition is satisfied, the controller 210 may execute the sensor of the sensor unit 270 and the OS or various applications stored in the storage unit 275.

Because the processor 211, the ROM 212, and the RAM 213 of the wearable apparatus 200 are substantially similar to the processor 111, the ROM 112, and the RAM 113 of the portable apparatus 100 (for example, a control apparatus is different), redundant description thereof will be omitted.

The controller 210 of the wearable apparatus 200 according to various embodiments establishes a connection of first wireless communication to the portable apparatus, receives location information of the portable apparatus corresponding to a connection termination time from the portable apparatus through second wireless communication when the connection of the first wireless communication to the portable apparatus is terminated, and displays the received location information on the screen.

The first wireless communication is performed by an interface which is selected among the mobile communication interface 220, the WLAN unit 231 and the short-range communication interface 232. Further, the second wireless communication is performed by another interface among the mobile communication interface 220, the WLAN unit 231 and the short-range communication interface 232. Further, the wireless communication, for example, may be mobile communication including next generation communication as well as second, third, fourth, and fifth generation communication, a wireless local area network (WLAN), wireless fidelity (Wi-Fi), Bluetooth (BT), BT low energy, ZigBee, Wi-Fi direct (WFD), ultra wideband (UWB), infrared data association (IrDA), and near field communication (NFC)), or the like.

When the connection of the first wireless communication to the portable apparatus is terminated, the controller 210 may control location movement information of the portable apparatus 100 to be received.

When the connection of the first wireless communication to the portable apparatus is terminated, the controller 210 may control remaining battery capacity information of the portable apparatus 100 to be received from the portable apparatus 100.

When the connection of the first wireless communication to the portable apparatus is terminated, the controller 210 may control ringer mode information of the portable apparatus 100 to be received from the portable apparatus 100.

The controller 210 may control the user's touch received through the touch screen 290 to be detected.

When the ringer mode information of the portable apparatus 100 is received through the second wireless communication with the portable apparatus 100, the controller 210 may control a control command corresponding to a ringer mode change request of the portable apparatus 100 to be generated in correspondence with the user's touch.

The controller 210 may control the generated control command to be transmitted to the portable apparatus 100 through the second wireless communication.

The controller 210 may control at least one of visual, auditory, and haptic feedback to be provided in correspondence with termination of the connection of the first wireless communication with the portable apparatus 100.

In various embodiments of the present disclosure, the term "controller 210 of the wearable apparatus" includes the processor 211, the ROM 212, and the RAM 213.

The wearable apparatus 200 may include the mobile communication interface 220 and the sub communication interface 230 and the sub communication interface 230 may include a WLAN unit 231 and a short-range communication interface 232. Because the mobile communication interface 220 and the sub communication interface 230 of the wearable apparatus 200 are substantially similar to the mobile communication interface 120 and the sub communication interface 130 of the portable apparatus 100, redundant description thereof will be omitted.

The short-range communication interface 232 may detect the termination of the connection between the portable apparatus 100 and the wearable apparatus 200 according to control of the controller 210. For example, the controller 210 may determine the termination of the connection between the portable apparatus 100 and the wearable apparatus 200 using an RSSI or profile link OFF.

The mobile communication interface 220 may receive location information (for example, latitude, longitude, and time) corresponding to the connection termination time from the portable apparatus 100 according to control of the controller 210.

The controller 210 may store the detected RSSI information (for example, an RSSI ID, an RSSI value, an RSSI detection time, or the like) in the storage unit 275.

In addition, when the connection between the portable apparatus 100 and the wearable apparatus 200 is terminated, the short-range communication interface 230 may transmit location information (for example, latitude, longitude, and time) corresponding to the connection termination time to the portable apparatus 100 according to control of the controller 210.

The multimedia unit 240 may include an audio reproduction unit 241, a video reproduction unit 242, or both the audio reproduction unit 241 and the video reproduction unit 242.

Because the audio reproduction unit 241 and the video reproduction unit 242 of the wearable apparatus 200 are substantially similar to the audio reproduction unit 142 and the video reproduction unit 143 of the portable apparatus 100, redundant description thereof will be omitted.

According to various embodiments, the audio reproduction unit 241 may reproduce auditory feedback (for example, an output of an audio source stored in the storage unit) corresponding to location information through the audio codec according to control of the controller 210. According to various embodiments, the audio reproduction unit 241 may reproduce auditory feedback (for example, an output of an audio source stored in the storage unit) corresponding to the transmission of location movement information through the audio codec according to control of the controller 210.

According to various embodiments, the video reproduction unit 242 may reproduce visual feedback (for example, an output of a video source stored in the storage unit) corresponding to the reception of location information through the video codec according to control of the controller 210. According to various embodiments of the present disclosure, the video reproduction unit 242 may reproduce visual feedback (for example, an output of a video source stored in the storage unit) corresponding to the transmission of movement information through the video codec according to control of the controller 210.

The camera 250 may include a first camera 251 for capturing a still image or a moving image according to control of the controller 210. The camera 250 may include an auxiliary light source (for example, a flash 252) for providing a light intensity necessary for the first camera 251 to capture an image.

The GPS unit 255 periodically receives information (for example, accurate location information and time information of the GPS satellite capable of being received by the wearable apparatus 200) from a plurality of GPS satellites orbiting the earth. Because the GPS unit 255 of the wearable apparatus 200 is substantially similar to the GPS unit 155 of the portable apparatus 100, redundant description thereof will be omitted.

In various embodiments of the present disclosure, the controller 210 may calculate the outdoor location using the GPS unit 255 or the indoor location using a wireless AP (not illustrated). The controller 210 may store the calculated outdoor or indoor location in the storage unit 275.

The input/output unit 260 may include at least one of buttons 261, a microphone 262, a speaker 263, a vibration motor 264, and a connector 265.

Referring to FIGS. 1 and 2, the buttons 261 include a home button 261a located in a lower portion of a front surface of the wearable apparatus 200. The buttons 261 may include a home button (not illustrated) on a side surface (not illustrated) of the wearable apparatus 200.

The buttons 261 of the wearable apparatus 200 may be implemented as touch buttons in a bezel outside the touch screen 290 as well as physical buttons. In addition, the buttons 261 of the wearable apparatus 200 may be displayed in the form of text, an image, or an icon on the touch screen 290.

The microphone 262 receives an external voice or sound to generate an electrical signal according to control of the controller 210. The electrical signal generated from the microphone 262 is converted by an audio codec and the converted signal may be stored in the storage unit 275 or output through the speaker 263. One or more microphones 262 may be located in the front, side, and rear surfaces of the wearable apparatus 200. In addition, one or more microphones 262 may be located only in the side surface of the wearable apparatus 200.

The speaker 263 may output sounds corresponding to various signals (for example, a radio signal, a broadcast signal, an audio source, a video file, an image capturing signal, and the like) of the communication interfaces 220 and 230, the multimedia unit 240, and the camera 250 using the audio codec according to control of the controller 210.

The speaker 263 may output a sound (for example, a touch operation sound corresponding to a phone number input or an image capturing button operation sound) corresponding to a function of the wearable apparatus 200. The speaker 263 may be located in one of the front, side, and rear surfaces of the wearable apparatus 200. A plurality of speakers may be located in the wearable apparatus 200.

According to various embodiments, the speaker 263 may output auditory feedback in correspondence with the reception of location information according to control of the controller 210. According to various embodiments of the present disclosure, the speaker 263 may output auditory feedback in correspondence with the transmission of location movement information according to control of the controller 210.

The vibration motor 264 may convert an electric signal into mechanical vibration according to control of the controller 210. Because the vibration motor 264 of the wearable apparatus 200 is substantially similar to the vibration motor 164 of the portable apparatus 100, redundant description thereof will be omitted.

According to various embodiments, the vibration motor 264 may output haptic feedback in correspondence with the reception of location information according to control of the controller 210. According to various embodiments, the vibration motor 264 may output haptic feedback in correspondence with the transmission of location movement information according to control of the controller 210.

In addition, the vibration motor 264 may provide various types of haptic feedback (for example, various intensities and durations of vibration) which are pre-stored or externally received based on a control command of the controller 210.

The connector 265 may be used as an interface for connecting the portable apparatus 100 and the wearable apparatus 200 or the wearable apparatus 200 and a power source (not illustrated) by wire. Because the connector 265 of the wearable apparatus 200 is substantially similar to the connector 165 of the portable apparatus 100, redundant description thereof will be omitted.

In addition, the wearable apparatus 200 may include a keypad (not illustrated). The user may input a phone number, a message, or the like using the keypad (not illustrated).

The sensor unit 270 may detect an internal or external state of the wearable apparatus 200 according to control of the controller 210. The sensor unit 270 may include a proximity sensor 271, an illumination sensor 272, and a gyro sensor 273. The sensor unit 270 may detect the internal or external state change of the wearable apparatus 200 according to control of the controller 210. The sensor unit 270 transmits an electric signal corresponding to the detected state of the wearable apparatus 200 to the controller 210. Because the sensor unit 270 of the wearable apparatus 200 is substantially similar to the sensor unit 170 of the portable apparatus 100, redundant description thereof will be omitted.

Those skilled in the art will readily understand that the sensor included in the sensor unit 270 may be added or omitted according to performance of the wearable apparatus 200.

According to control of the controller 210, the storage unit 275 may store signals or data to be input/output in correspondence with operations of the communication interfaces 220 and 230, the multimedia unit 240, the camera 250, the GPS unit 255, the input/output unit 260, the sensor unit 270, and the touch screen 290. The storage unit 275 may store a GUI related to a control program for the wearable apparatus 200 or control of the controller 210 and an application initially provided by a manufacturer or externally downloaded, images for providing the GUI, user information, documents, DBs, or related data.

The storage unit 275 according to various embodiments of the present disclosure may store apparatus information of the portable apparatus 100 and apparatus information of the wearable apparatus 200.

The storage unit 275 may store at least one BT profile and store a normal connection termination signal and/or an abnormal connection termination signal between the portable apparatus 100 and the wearable apparatus 200.

The storage unit 275 may store location information (for example, outdoor location information, indoor location information, or outdoor location movement information) calculated through the reception from the GPS satellite of the portable apparatus 100 received from the portable apparatus 100 or location information (for example, indoor location information or indoor location movement information) calculated through reception from the wireless AP.

The storage unit 275 may store remaining battery capacity information of the portable apparatus 100 and/or ringer mode information of the portable apparatus 100 received from the portable apparatus 100.

The storage unit 275 may store a control packet corresponding to a ringer mode change request received from the portable apparatus 100.

The storage unit 275 may store visual feedback (for example, a video source or the like) recognizable by the user output to the touch screen 290, auditory feedback (for example, a sound source or the like) recognizable by the user output from the speaker 263, and haptic feedback (for example, a haptic pattern or the like) recognizable by the user output from the vibration motor 264 in correspondence with transmission of the location information, the location movement information, the remaining battery capacity information, and the ringer mode information.

The storage unit 275 may store a feedback providing time (for example, 300 msec) of the feedback to be provided to the user.

In various embodiments of the present disclosure, the term "storage unit" includes the storage unit 275, the ROM 212 or the RAM 213 within the controller, or a memory card (not illustrated) (for example, a micro SD card or a memory stick) mounted in the wearable apparatus 200. In addition, the storage unit may include a nonvolatile memory, a volatile memory, an HDD, or an SSD.

The power unit 280 may supply electric power to any or all of the components 210 to 290 located inside the wearable apparatus 200 according to control of the controller 210. The power unit 280 may supply the wearable apparatus 200 with electric power input from an external power source (not illustrated) through a wired cable (not illustrated) connected to a connector (not illustrated) according to control of the controller 210. Because the power unit 280 of the wearable apparatus 200 is substantially similar to the power unit 180 of the portable apparatus 100, redundant description thereof will be omitted.

The power unit 280 may wirelessly charge one or more batteries (not illustrated) according to control of the controller 210 (for example, a self-resonance scheme, an electromagnetic scheme, and a self-induction scheme).

The touch screen 290 includes a touch panel (not illustrated) for receiving a touch input and a display panel (not illustrated) for displaying a screen. The touch screen 290 may provide the user with GUIs corresponding to various services (for example, voice communication, video communication, data transmission, broadcast reception, image capturing, video view, and application execution). The touch screen 290 transmits an analog signal corresponding to a single touch or a multi-touch input through the home screen 191 or the GUI to the touch screen controller 195. The touch screen 190 may receive the single touch or the multi-touch input through the user's body (for example, fingers including the thumb) or the input pen 167.

Because the touch screen 290 of the wearable apparatus 200 is substantially similar to the touch screen 190 of the portable apparatus 100, redundant description thereof will be omitted.

The touch screen controller 295 converts an analog signal corresponding to the single touch or the multi-touch received from the touch screen 290 into a digital signal and transmits the digital signal to the controller. The controller 210 may calculate X and Y coordinates corresponding to a touch position on the touch screen 290 using the digital signal received from the touch screen controller 295. The controller 210 may control the touch screen 290 using the digital signal received from the touch screen controller 295.

Because the touch screen controller 295 of the wearable apparatus 200 is substantially similar to the touch screen controller 195 of the portable apparatus 100, redundant description thereof will be omitted.

Those skilled in the art will easily understand that, in terms of the components of the wearable apparatus 200 illustrated in FIG. 2, at least one component may be added or omitted in correspondence with performance of the wearable apparatus 200.

Those skilled in the art will readily understand that, while the portable apparatus 100 and the wearable apparatus 200 are implemented in FIGS. 1 and 2, a plurality of electronic apparatuses having a mobile communication interface and a sub communication interface may be implemented.

Figure 3:
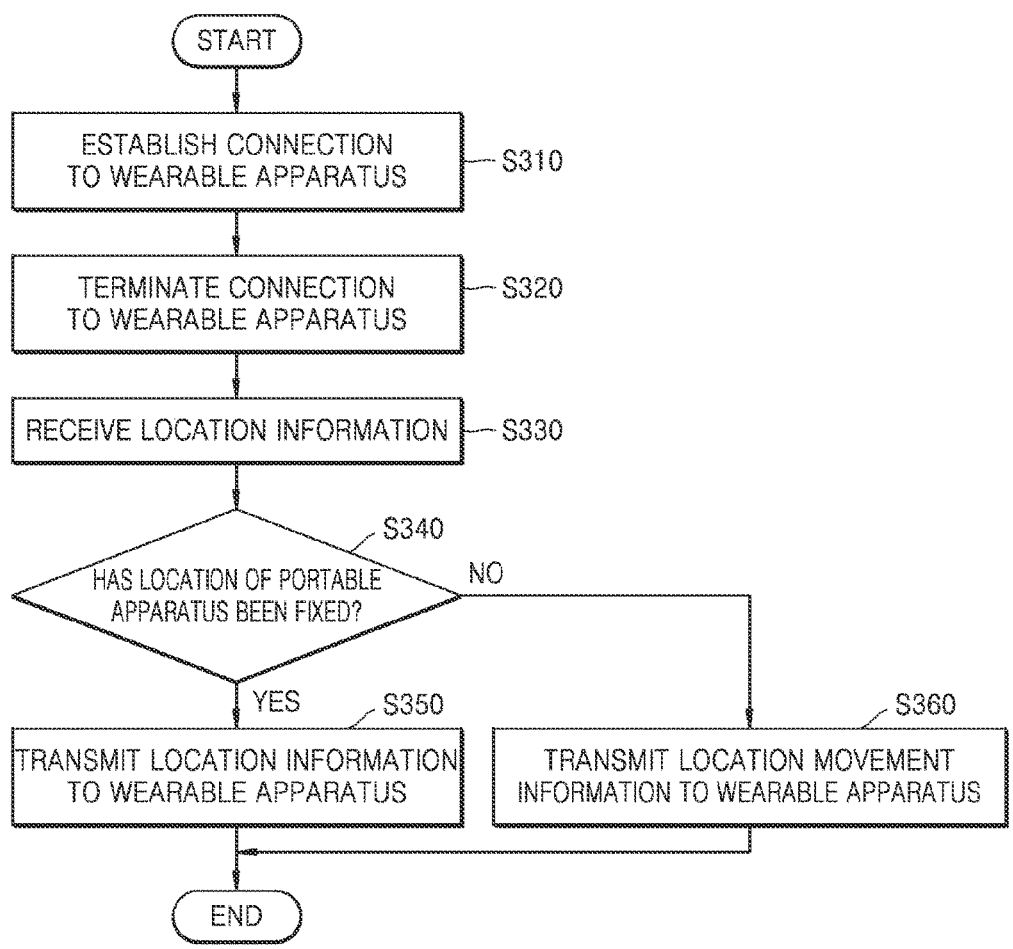
FIG. 3 is a flowchart illustrating a method of controlling location information of a portable apparatus according to an embodiment of the present disclosure.

FIG. 3 is a flowchart illustrating a method of controlling location information of a portable apparatus according to an embodiment of the present disclosure.

FIGS. 5A to 5E are diagrams illustrating screen examples of a portable apparatus and a wearable apparatus according to various embodiments of the present disclosure.

Referring to FIG. 3, a wearable apparatus is connected in operation S310.

Figure 5A:
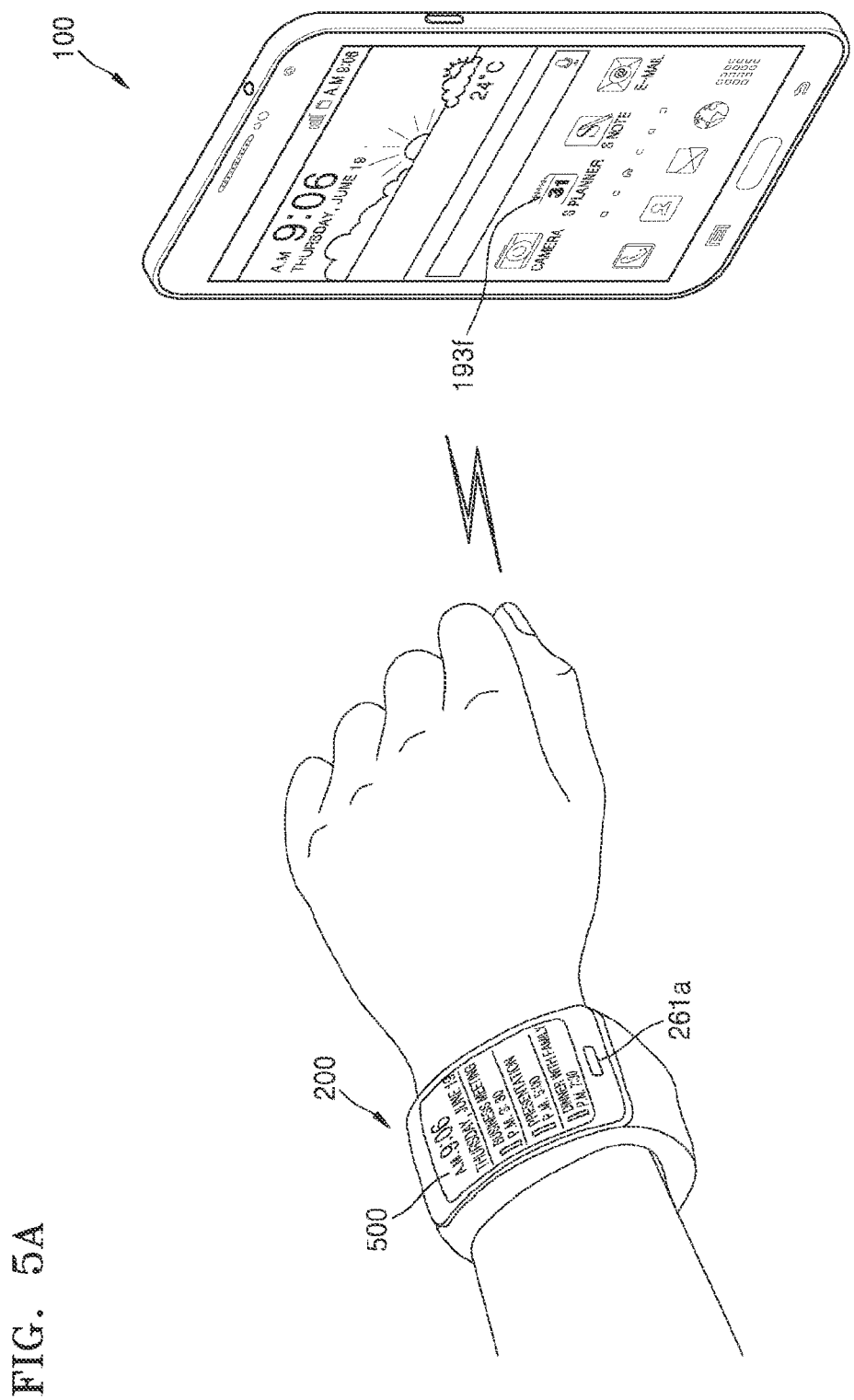

Referring to FIG. 5A, the controller of the portable apparatus 100 may search for a peripheral wearable apparatus 200 using a communication interface. The user may select the wearable apparatus 200 serving as a connection target from a search list (not illustrated) corresponding to a search result displayed on the screen of the portable apparatus 100. The controller of the portable apparatus 100 may establish a connection of first wireless communication to the communication interface of the wearable apparatus 200 using the communication interface of the portable apparatus 100 in correspondence with the user's selection. For example, the first wireless communication may be wireless communication (for example, short-range wireless communication) having a limited transmission distance (for example, 1 m or less, 10 m or less, 100 m or less, or the like). The portable apparatus 100 and the wearable apparatus 200 may be connected to the first wireless communication having the limited transmission distance. The first wireless communication may be the short-range wireless communication, but is not limited thereto. In addition, second wireless communication may be long-range wireless communication, and may include mobile communication, but is not limited thereto.

When the portable apparatus 100 and the wearable apparatus 200 are connected through BT, the portable apparatus 100 and the wearable apparatus 200 may be connected through a mutually supported profile (for example, an advanced audio distribution profile (A2DP), an audio/video remote control profile (AVRCP), a headset profile (HSP), and a hands-free profile (HFP)).

When the portable apparatus 100 and the wearable apparatus 200 are connected, the controller may transmit portable apparatus information and content (for example, schedule information) to be executed in the portable apparatus 100 to the wearable apparatus 200 through the communication interface.

When the portable apparatus 100 and the wearable apparatus 200 are connected, the controller of the portable apparatus 100 may store the wearable apparatus information received from the wearable apparatus 200 in the storage unit 175. The stored apparatus information of the wearable apparatus 200 may include wireless connection information (for example, including a service set identifier (SSID), an Internet protocol (IP) address, a medium access control (MAC) address, a channel number, a security key, etc.), a product name of the wearable apparatus 200, an ID of the wearable apparatus 200, a MAC address of the wearable apparatus 200, a type of the wearable apparatus 200, a profile of the wearable apparatus 200, a communication scheme of the wearable apparatus 200, etc. The stored content information may include a content ID, a content name, a content type (for example, a computer game or the like), a touch pad application execution command, etc.

The controller of the wearable apparatus 200 may search for the peripheral portable apparatus 100 using the communication interface. The user may select the portable apparatus 100 from a search list (not illustrated) corresponding to a search result displayed on the screen of the wearable apparatus 200. The controller of the wearable apparatus 200 may be wirelessly connected to the communication interface of the portable apparatus 100 using the communication interface in correspondence with the user's selection.

When the portable apparatus 100 and the wearable apparatus 200 are connected, the controller of the wearable apparatus 200 may store the portable apparatus information and content (for example, schedule information) to be executed received from the portable apparatus 100 in the storage unit. The stored portable apparatus information may include wireless connection information (for example, including an SSID, an IP address, a MAC address, a channel number, a security key, etc.), a product name of the portable apparatus 100, an ID of the wearable apparatus 200, a MAC address of the portable apparatus 100, a type of the portable apparatus 100, a profile of the portable apparatus 100, a communication scheme of the portable apparatus 100, etc.

When the portable apparatus 100 and the wearable apparatus 200 are connected, the controller of the wearable apparatus 200 may transmit information of an application (for example, the touch pad application) to be executed using a second communication interface to the portable apparatus 100.

When the portable apparatus 100 and the wearable apparatus 200 are connected, the controller of the portable apparatus 100 may transmit application information corresponding to an application to be executed using the communication interface to the wearable apparatus 200. The application information, for example, may include application identification information (for example, a product name, an ID, a classification code, or the like), state information (for example, execution, standby, stop, etc. of the application) of a corresponding application at a point in time at which the application information is transmitted, etc.

The current state is a state in which the portable apparatus 100 is connected to the wearable apparatus 200.

The controller of the portable apparatus 100 connected to the wearable apparatus 200 may transmit schedule information registered (or updated) in a schedule application corresponding to a shortcut icon 193f to the wearable apparatus 200. The controller of the wearable apparatus 200 may display a schedule 500 corresponding to schedule information received from the portable apparatus 100 on the screen. In addition, the controller of the wearable apparatus 200 may request the portable apparatus 100 to provide the schedule information. The controller of the portable apparatus 100 may transmit the schedule information corresponding to the request of the wearable apparatus 200 to the wearable apparatus 200.

The controller may display the schedule 500 in a daily, weekly, or monthly form, or the like.

In operation S320 of FIG. 3, a connection to the wearable apparatus is terminated.

Referring to FIG. 5B, a connection between the portable apparatus 100 and the wearable apparatus 200 may be terminated. The controller may detect the termination of the connection to the wearable apparatus 200 using the communication interface. The controller may detect the termination of the connection between the portable apparatus 100 and the wearable apparatus 200 using various methods.

In various embodiments, the controller may detect the termination of the connection between the portable apparatus 100 and the wearable apparatus 200 using the RSSI value. When the communication interface of the portable apparatus 100 receives a radio signal transmitted from the wearable apparatus 200, the controller may calculate the RSSI value. The RSSI may include interference and/or noise of an adjacent channel received by the communication interface of the portable apparatus 100. The controller may periodically calculate the RSSI value (wherein a calculation cycle is, for example, 2 sec and changeable).

The following Table 1 indicates an example of a range of an RSSI value stored in the storage unit of the portable apparatus 100.

TABLE 1

| RSSI range [dBm] | Connection state | Action |
| --- | --- | --- |
| 0 to −60 | Good | |
| −61 to −70 | OK | |
| −71 to −90 | Poor | Notify |
| Less than −90 | Bad | Notify |

Here, information indicating the range of the stored RSSI value may include a plurality of items indicating the range of the RSSI value, the connection state corresponding to the range of the RSSI value, and the action corresponding to the range of the RSSI value. Those skilled in the art will readily understand that the information is not limited to the above-described items, but may include items (an application to be executed in correspondence with an RSSI value range and a component corresponding to the application to be executed) indicating various information.

The controller may compare the periodically calculated RSSI value with Table 1. According to a comparison result, the controller may determine a connection state between the portable apparatus 100 and the wearable apparatus 200. For example, when the calculated RSSI value is between −71 dBm and −90 dBm, the controller may determine that the connection state of the portable apparatus 100 for the wearable apparatus 200 is poor. When the calculated RSSI value is less than or equal to −91 dBm, the controller may determine that the state of the connection of the portable apparatus 100 for the wearable apparatus 200 is bad.

When the connection state is poor or bad, the controller may determine that the state of the connection between the portable apparatus 100 and the wearable apparatus 200 is the connection termination. When the connection state is poor, the controller may transmit a control command (not illustrated) for outputting an alarm (e.g. a beep) through the speaker or outputting an alarm (e.g. a beep) corresponding to the connection termination to the wearable apparatus 200.

When the connection state is bad, the controller may transmit a control command for outputting a beep through the speaker or outputting an alarm (e.g. a beep) corresponding to the connection termination to the wearable apparatus 200.

The controller may set a threshold RSSI value (which is, for example, −85 dBm and changeable) according to setting of the manufacturer or the user's input. For example, when the calculated RSSI value is −87 dBm, the controller may compare the calculated RSSI value with the threshold RSSI value, and the state of the connection between the portable apparatus 100 and the wearable apparatus 200 may be determined to be the connection termination. Those skilled in the art will readily understand that the RSSI value is changeable according to performance and structures of the portable apparatus 100 and the wearable apparatus 200.

The storage unit may store the calculated RSSI value according to control of the controller. In addition, the storage unit may store the periodically calculated RSSI value according to control of the controller.

In another embodiment, the controller may detect the termination of the connection between the portable apparatus 100 and the wearable apparatus 200 using a BT profile link. When the portable apparatus 100 and the wearable apparatus 200 are connected through BT, a BT profile supported by the portable apparatus 100 and the wearable apparatus 200 among many BT profiles may include an A2DP which is a profile for supporting high-quality stereo audio streaming, an AVRCP which is a profile for supporting a remote control command, an HFP which is a profile for transmitting/receiving the communication voice or performing control, an HSP which is a profile for supporting audio, or a serial port profile (SPP) which is a profile for supporting serial communication.

Those skilled in the art will readily understand that various other profiles as well as the above-described profiles are supported by the portable apparatus 100 and the wearable apparatus 200.

When the portable apparatus 100 and the wearable apparatus 200 are connected through a profile, a profile link connected between the portable apparatus 100 and the wearable apparatus 200 is established. When a link of one profile among a plurality of connected profiles is disconnected, the controller may output a normal connection termination signal. When links of all profiles among the plurality of connected profiles are disconnected, the controller may generate an abnormal connection termination signal.

The abnormal connection termination may occur, for example, when the distance between the portable apparatus 100 and the wearable apparatus 200 exceeds a maximum BT connection distance (which is, for example, 10 m and differs according to a BT version), when a radio signal is weak between the portable apparatus 100 and the wearable apparatus 200 or there is a great amount of noise (for example, underground, inside an elevator, or the like), or when there are a number of obstacles (for example, walls, doors, etc.) between the portable apparatus 100 and the wearable apparatus 200.

When the abnormal connection termination signal is generated, the controller may determine the state of the connection between the portable apparatus 100 and the wearable apparatus 200 as the connection termination. When the abnormal connection termination signal is generated, the controller may transmit a control command (not illustrated) for outputting a beep through the speaker or outputting a beep corresponding to the connection termination to the wearable apparatus 200.

When the connection to the wearable apparatus 200 is terminated, the controller may display a popup window 550 corresponding to the termination of the connection between the portable apparatus 100 and the wearable apparatus 200 on the screen.

The storage unit may store a normal connection termination signal and/or an abnormal connection termination signal according to control of the controller.

In operation S330 of FIG. 3, a signal corresponding to location information is received.

Figure 5C:
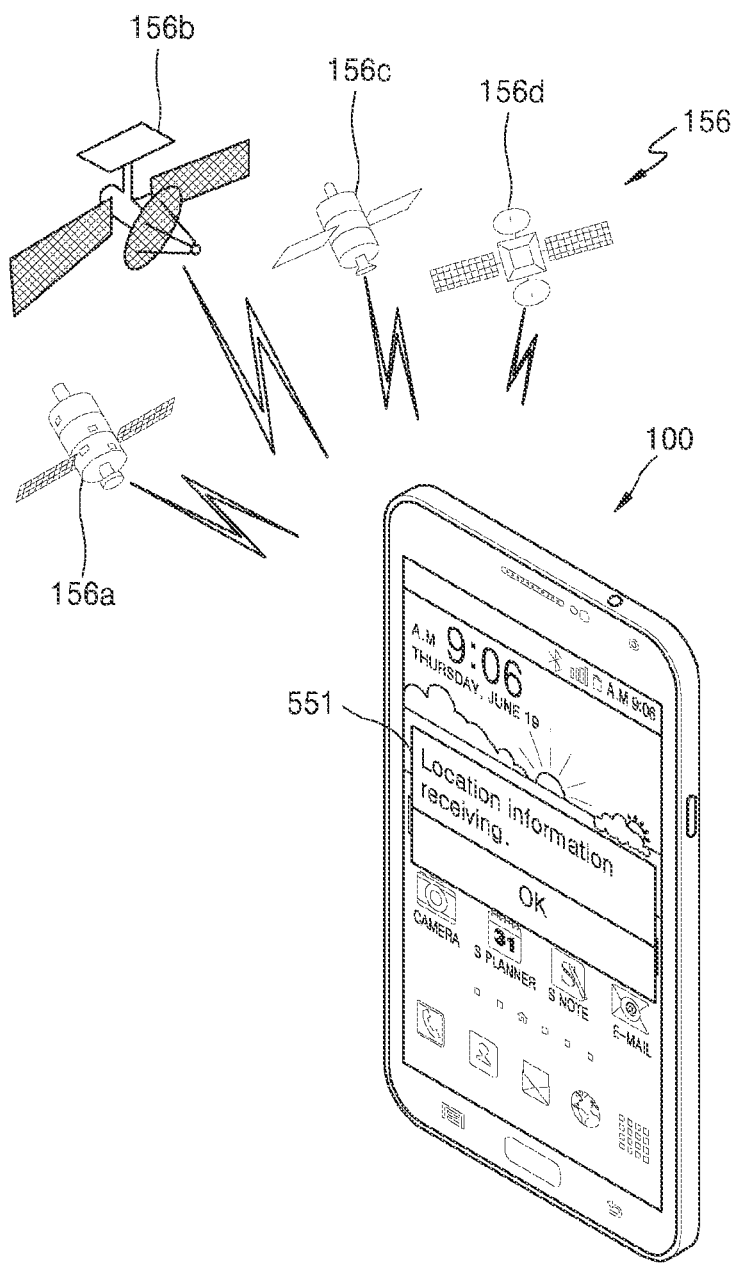

Referring to FIG. 5C, the controller may receive signals from a plurality of GPS satellites 156 through the GPS unit in operation when the state of the connection between the portable apparatus 100 and the wearable apparatus 200 is connection termination. The controller may determine the "connection termination location" of the portable apparatus 100 using the received signal. At the connection termination time at which the connection between the portable apparatus 100 and the wearable apparatus 200 is terminated, the controller may determine the "connection termination location" after receiving signals from a plurality of GPS satellites 156 a plurality of times to correctly measure an outdoor location of the portable apparatus 100.

When the GPS unit does not operate at the connection termination time at which the connection between the portable apparatus 100 and the wearable apparatus 200 is terminated, the controller may execute the GPS unit. The executed GPS unit may receive signals from the plurality of GPS satellites 156 according to control of the controller.

The controller may determine the "connection termination location" using one of a signal received before the connection termination time and a signal received after the connection termination time.

The controller may determine the "connection termination location" of the portable apparatus 100 located indoors using the wireless AP.

When the Wi-Fi (not illustrated) communication does not operate at the connection termination time at which the connection between the portable apparatus 100 and the wearable apparatus 200 is terminated, the controller may activate the Wi-Fi communication of the portable apparatus 100. The controller may receive a signal from the wireless AP using the Wi-Fi communication. At the connection termination time at which the connection between the portable apparatus 100 and the wearable apparatus 200 is terminated, the controller may determine the "connection termination location" after receiving a signal from a wireless AP a plurality of times to correctly measure an indoor location of the portable apparatus 100.

When signals are received from the plurality of GPS satellites 156, the controller may display a popup window 551 corresponding to signal reception from the plurality of GPS satellites 156 on the screen.

The storage unit may store the received signal and/or "connection termination location" according to control of the controller.

In operation S340 of FIG. 3, it is determined whether the portable apparatus moves.

The controller may determine whether the portable apparatus 100 moves. The movement of the portable apparatus 100 may be determined using the communication interface, the camera, the GPS unit, or the sensor unit according to control of the controller. For example, the controller may detect the movement of the portable apparatus 100 using the communication interface and the wireless AP. The controller may detect the movement of the portable apparatus 100 using the signal received from the GPS satellite through the GPS unit. The controller may detect the movement of the portable apparatus 100 using the sensor unit. For example, the controller may detect the movement of the portable apparatus 100 using an acceleration sensor or a motion sensor.

The storage unit may store state information (for example, an ID for history management, a detection sensor name, a detection sensor type, a state of the portable apparatus corresponding to fixation or movement, a detection time, or the like) corresponding to the movement of the portable apparatus 100 or state information (for example, an ID for history management, a detection sensor name, a detection sensor type, a state of the portable apparatus corresponding to fixation or movement, a detection time, or the like) corresponding to the fixation of the portable apparatus 100 according to control of the controller.

When the portable apparatus 100 is fixed, the process proceeds to operation S350 of FIG. 3.

In operation S350 of FIG. 3, location information is transmitted to the wearable apparatus.

When the location of the portable apparatus 100 is fixed, the controller may transmit location information corresponding to the connection termination location of the portable apparatus 100 to the wearable apparatus 200 through second wireless communication. For example, the second wireless communication may be wireless communication (for example, mobile communication using a phone number) in which a transmission distance is not limited. The portable apparatus 100 and the wearable apparatus 200 may be connected through the mobile communication.

When the connection between the portable apparatus 100 and the wearable apparatus 200 is terminated, the controller may transmit location information corresponding to the connection termination location of the portable apparatus 100 to the wearable apparatus 200 through the mobile communication interface 120. The controller may iteratively transmit location information corresponding to the connection termination location of the portable apparatus 100 in a preset cycle (for example, 50 msec).

When a response corresponding to reception of location information corresponding to the connection termination location is received from the wearable apparatus 200 to the portable apparatus 100, the controller may stop the transmission of the location information corresponding to the termination location of the connection to be periodically transmitted.

The controller of the wearable apparatus 200 may receive the location information corresponding to the connection termination location of the portable apparatus 100 through the mobile communication interface.

The storage unit may store the location information corresponding to the connection termination location of the portable apparatus 100 received according to control of the controller.

Figure 5D:
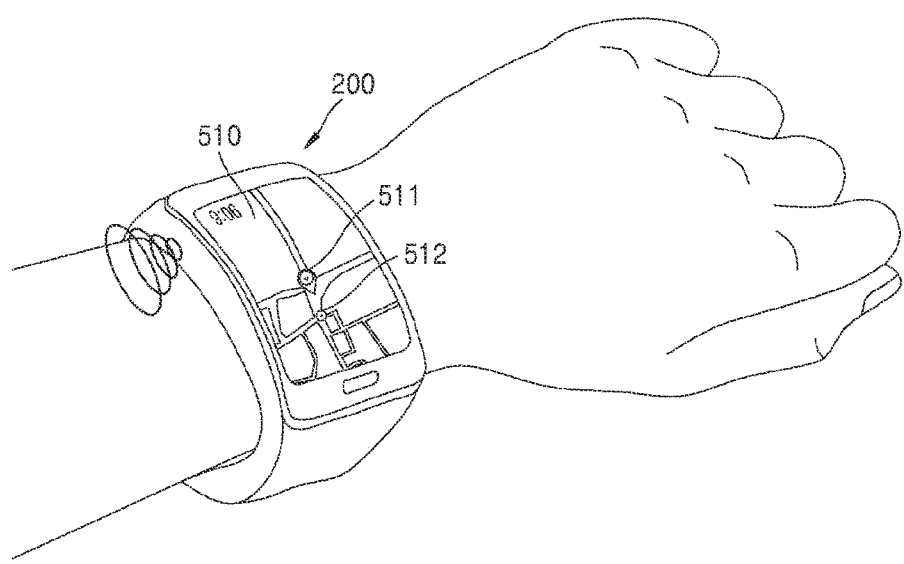

Referring to FIG. 5D, the controller of the wearable apparatus 200 may display the received location information corresponding to the connection termination location of the portable apparatus 100 on the screen.

The controller may display a connection termination location 511 of the portable apparatus 100 and a current location 512 of the wearable apparatus 200 on the screen through a map application 510. The controller may display a distance difference (for example, 50 m) between the connection termination location 511 of the portable apparatus 100 and the current location 512 of the wearable apparatus 200 through the map application 510. In addition, the controller may display a time duration (for example, 30 sec) from the connection termination time point of the portable apparatus 100 to a current time through the map application 510.

The controller of the wearable apparatus 200 may provide the user with feedback corresponding to the reception of the location information. The feedback provided from the wearable apparatus 200 may be provided as one of visual, auditory, and haptic feedback to the user. The controller may provide the user with one of the visual, auditory, and haptic feedback or a combination of the visual, auditory, and haptic feedback through the wearable apparatus 200.

The visual feedback may be displayed to be distinguished from an object displayed in an application 510 or 520 as a visual effect (for example, a separate image or an animation effect such as a fade applied to a separate image) corresponding to the reception of the location information. The auditory feedback may be output as a sound corresponding to the reception of the location information from a speaker. The haptic feedback may be output from a vibration motor in correspondence with the reception of the location information.

In an environmental setting (not illustrated) of the wearable apparatus 200, it is possible to select and/or change the feedback (for example, at least one of visual, auditory, and haptic feedback) corresponding to the reception of the location information.

The user may input and/or change a feedback providing time (which is, for example, 300 msec and changeable) in which at least one type of feedback is provided to the user.

The user may refer to the connection termination location 511 of the portable apparatus 100 displayed on the screen of the wearable apparatus 200 to find the portable apparatus 100 present in the connection termination location 511. The controller may display a movement path (or a shortest path) from the current location 512 to the connection termination location 511 through the map application 510. The user may move to the connection termination location 511 using the movement path displayed in the map application 510.

In operation S350 of FIG. 3, the method of controlling location information of the portable apparatus is completed when the location information is transmitted to the wearable apparatus.

When it is determined that the portable apparatus moves in operation S340 of FIG. 3, the process proceeds to operation S360 of FIG. 3.

In operation S360 of FIG. 3, the location movement information is transmitted to the wearable apparatus.

When the portable apparatus 100 moves, the controller may transmit the location movement information corresponding to the current location from the connection termination location to the wearable apparatus 200 through the communication interface. The location movement information of the portable apparatus 100 may be information indicating the location of the portable apparatus 100 according to the movement of the portable apparatus 100. For example, the location movement information may include a set of location values of the portable apparatus 100 according to the movement of the portable apparatus 100.

When the connection between the portable apparatus 100 and the wearable apparatus 200 is terminated, the controller may transmit the location movement information corresponding to the current location from the connection termination location of the portable apparatus 100 to the wearable apparatus 200 through the mobile communication interface.

When a response corresponding to the reception of the location movement information of the portable apparatus 100 is received from the wearable apparatus 200, the controller may stop the transmission of the location information corresponding to the current location from the connection termination location.

The controller of the wearable apparatus 200 may receive the location movement information of the portable apparatus 100 through the mobile communication interface.

According to control of the controller, the storage unit may store the location movement information of the portable apparatus 100 received through the mobile communication interface.

Figure 5E:
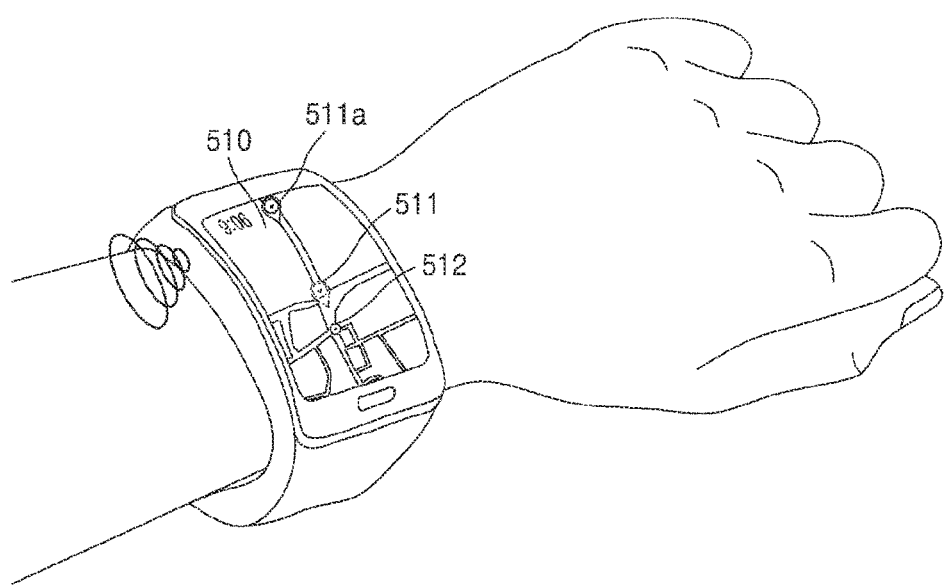

Referring to FIG. 5E, the controller of the wearable apparatus 200 may display a received movement path (or a shortest distance path) of the portable apparatus 100 on the screen.

The controller may display the connection termination location 511 of the portable apparatus 100, the current location (for example, on a bridge 511*a*) of the moved portable apparatus 100, and the current location 512 of the wearable apparatus 200 on the screen of the wearable apparatus 200 through the map application 510. The controller may display a distance difference (for example, 150 m) between the current location 511*a* of the portable apparatus 100 and the current location 512 of the wearable apparatus 200 or a runaway speed (for example, 4.2 m/s) of the portable apparatus 100 through the map application 510. In addition, the controller may display a time duration (for example, 70 sec) from the connection termination time of the moved portable apparatus 100 to the current time through the map application 510.

The user may refer to the movement path or the runaway speed of the portable apparatus 100 displayed on the screen of the wearable apparatus 200 to find the portable apparatus 100. The controller may display a shortest distance path from the current location 512 to the moved portable apparatus 100 through the map application 510. The user may rapidly move to the moved portable apparatus 100 using the shortest distance path displayed by the map application 510.

The controller of the wearable apparatus 200 may provide the user with feedback corresponding to the reception of the location movement information. The feedback provided from the wearable apparatus 200 may be provided as one of visual, auditory, and haptic feedback to the user. The controller may provide the user with one of the visual, auditory, and haptic feedback or a combination of the visual, auditory, and haptic feedback through the wearable apparatus 200.

The visual feedback may be displayed to be distinguished from an object displayed in an application 510 or 520 as a visual effect (for example, a separate image or an animation effect such as a fade applied to a separate image) corresponding to the reception of the location movement information. The auditory feedback may be output as a sound corresponding to the reception of the location movement information from the speaker. The haptic feedback may be output from the vibration motor in correspondence with the reception of the location movement information.

In an environmental setting (not illustrated) of the wearable apparatus 200, it is possible to select and/or change the feedback (for example, at least one of visual, auditory, and haptic feedback) corresponding to the reception of the location movement information.

The user may input and/or change a feedback providing time (which is, for example, 300 msec and changeable) in which at least one type of feedback is provided to the user.

In operation S360 of FIG. 3, the method of controlling location information of the portable apparatus is completed when the location movement information is transmitted to the wearable apparatus.

Figure 4:
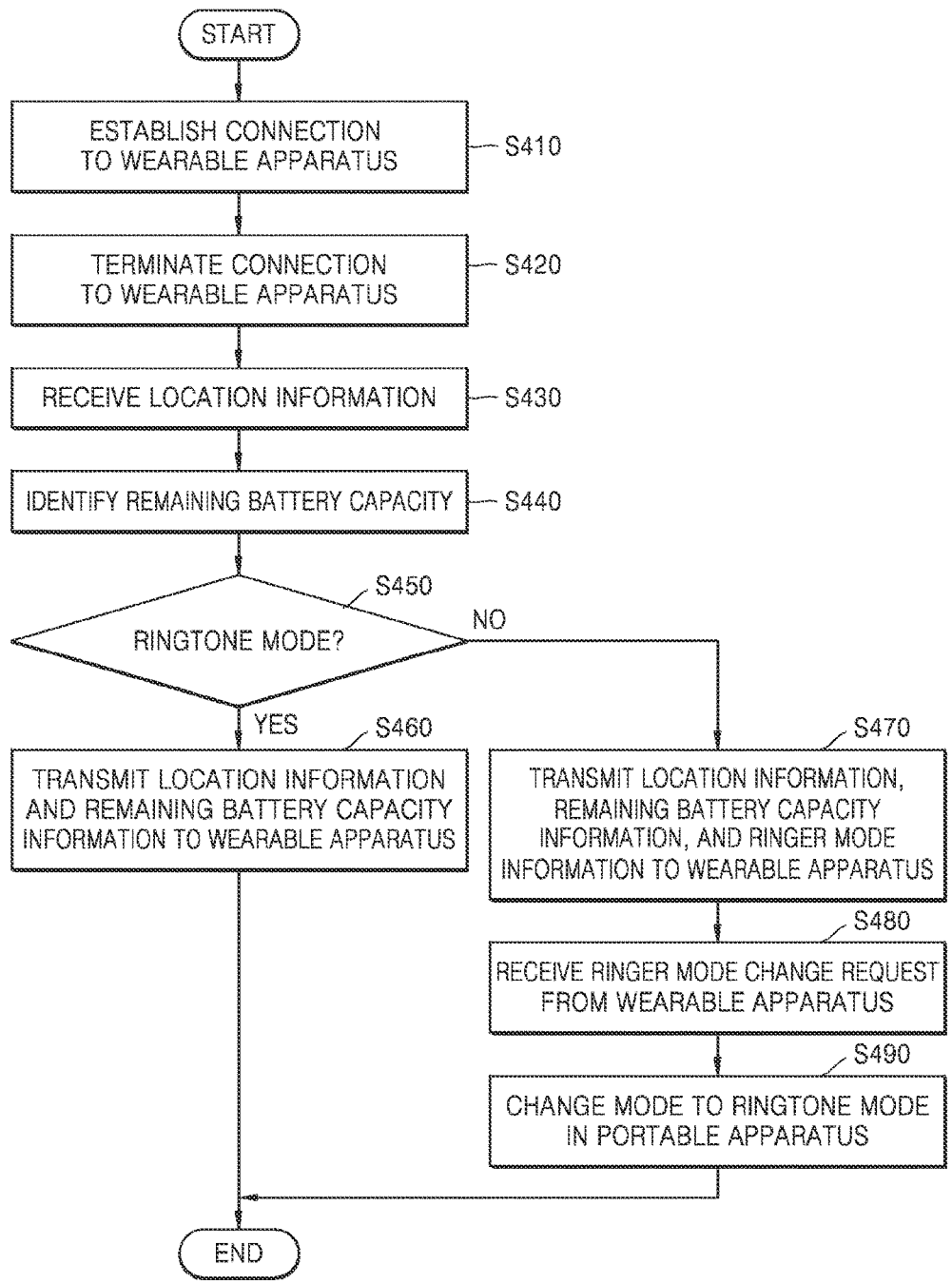
FIG. 4 is a flowchart illustrating a method of controlling location information of a portable apparatus according to an embodiment of the present disclosure.

FIG. 4 is a flowchart illustrating a method of controlling location information of a portable apparatus according to an embodiment of the present disclosure.

FIGS. 6A to 6H are diagrams illustrating screen examples of a portable apparatus and a wearable apparatus according to various embodiments of the present disclosure.

Referring to FIG. 4, the wearable apparatus is connected in operation S410.

Figure 6A:
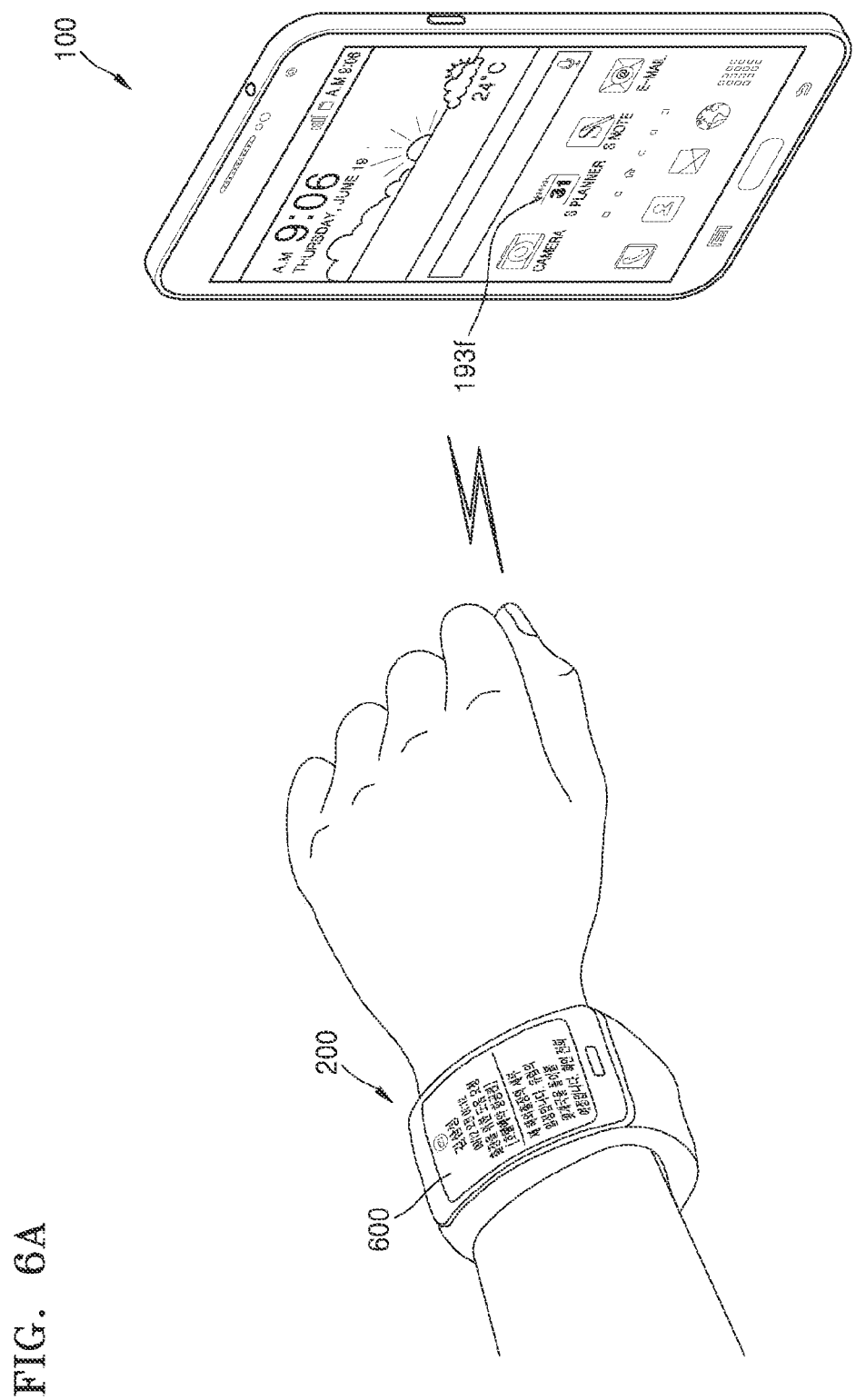
FIGS. 6A, 6B, 6C, 6D, 6E, 6F, 6G, and 6H are diagrams illustrating screen examples of a portable apparatus and a wearable apparatus according to various embodiments of the present disclosure.

Referring to FIG. 6A, the controller of the portable apparatus 100 may search for a peripheral wearable apparatus 200 using the communication interface. The user may select the wearable apparatus 200 serving as a connection target from a search list (not illustrated) corresponding to a search result displayed on the screen of the portable apparatus 100. The controller of the portable apparatus 100 may establish a wireless connection to the communication interface of the wearable apparatus 200 using the communication interface in correspondence with the user's selection. The controller of the portable apparatus 100 connected to the wearable apparatus 200 may transmit schedule information registered (or updated) in a schedule application corresponding to the shortcut icon 193*f* to the wearable apparatus 200. The controller of the wearable apparatus 200 may display a schedule 600 corresponding to schedule information received from the portable apparatus 100 on the screen.

When the portable apparatus 100 and the wearable apparatus 200 are connected through BT, the portable apparatus 100 and the wearable apparatus 200 may be connected through a mutually supported profile (for example, an A2DP, an AVRCP, an HSP, and an HFP).

Because the connection between the portable apparatus 100 and the wearable apparatus 200 in operation S410 of FIG. 4 is substantially the same as the connection between the portable apparatus 100 and the wearable apparatus 200 in operation S310 of FIG. 3, redundant description thereof will be omitted.

In operation S420 of FIG. 4, a connection to the wearable apparatus is terminated.

Figure 6B:
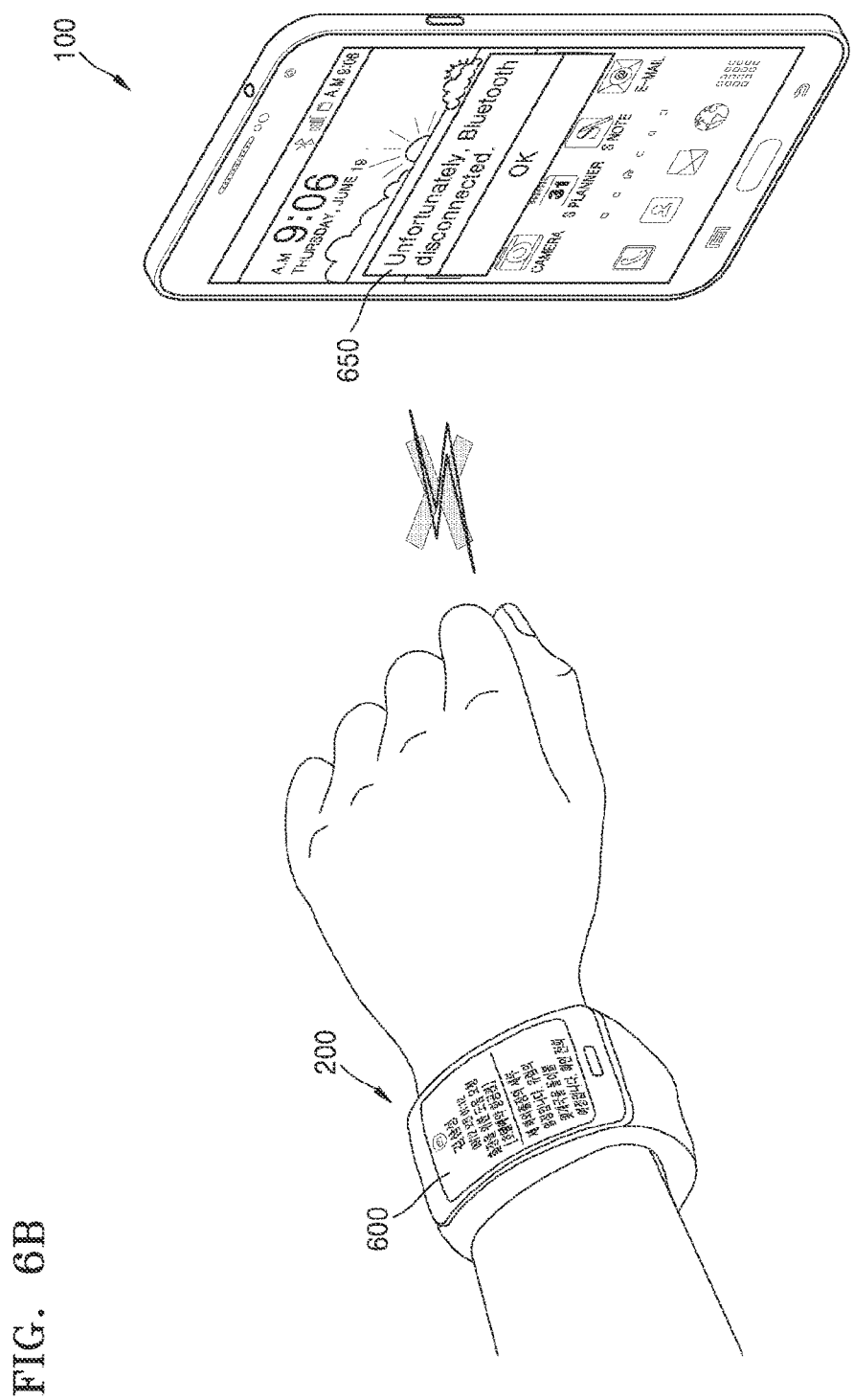

Referring to FIG. 6B, the controller may detect the termination of the connection to the wearable apparatus 200 using the communication interface. The controller may detect the termination of the connection between the portable apparatus 100 and the wearable apparatus 200 using various methods.

In various embodiments, the controller may detect the termination of the connection between the portable apparatus 100 and the wearable apparatus 200 using the RSSI value.

In another embodiment, the controller may detect the termination of the connection between the portable apparatus 100 and the wearable apparatus 200 using a BT profile link.

When the connection to the wearable apparatus 200 is terminated, the controller may display a popup window 650 corresponding to the termination of the connection between the portable apparatus 100 and the wearable apparatus 200 on the screen.

Because the termination of the connection between the portable apparatus 100 and the wearable apparatus 200 in operation S420 of FIG. 4 is substantially the same as the termination of the connection between the portable apparatus 100 and the wearable apparatus 200 in operation S320 of FIG. 3, redundant description thereof will be omitted.

In operation S430 of FIG. 4, a signal corresponding to location information is received.

Figure 6C:
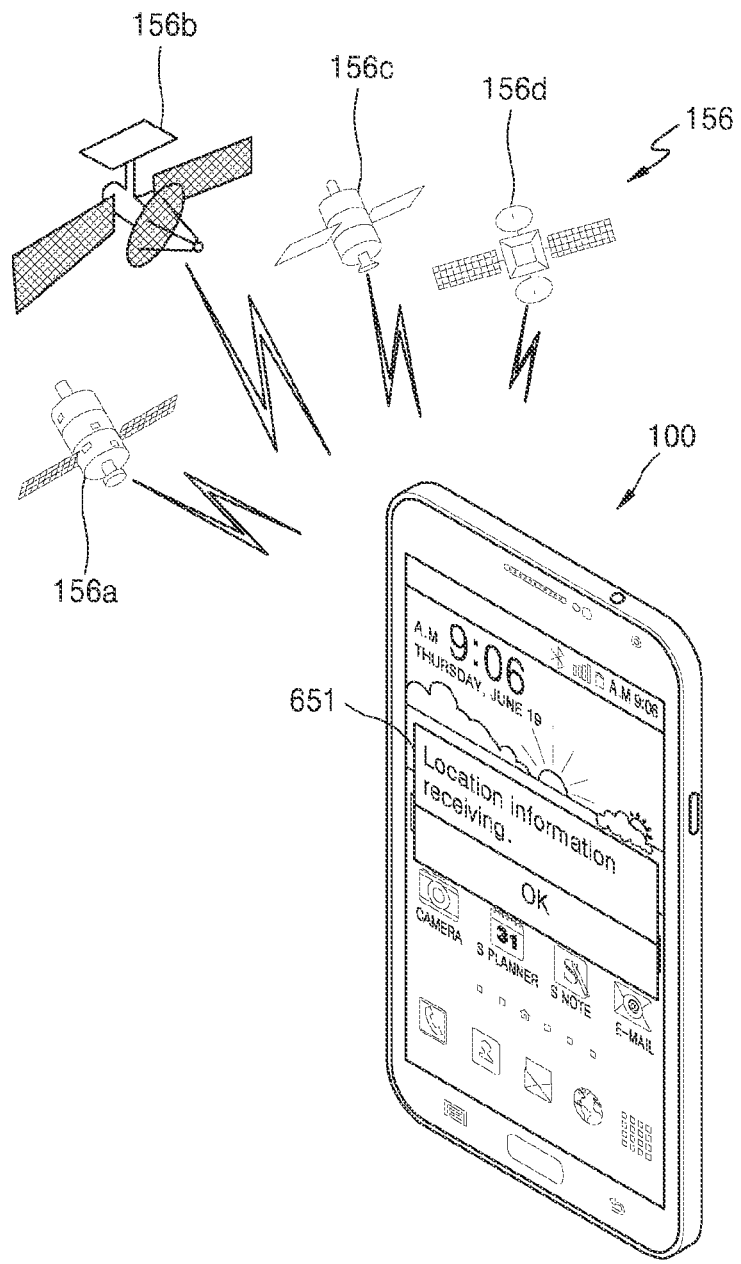

Referring to FIG. 6C, the controller may receive signals from a plurality of GPS satellites 156 through the GPS unit in operation when the connection state between the portable apparatus 100 and the wearable apparatus 200 is connection termination. The controller may determine a "connection termination location" of the portable apparatus 100 using the received signals.

When the signals are received from the plurality of GPS satellites 156, the controller may display a popup window 651 corresponding to signal reception from the plurality of GPS satellites 156 on the screen.

Because the signal reception corresponding to the location information of the portable apparatus 100 in operation S430 of FIG. 4 is substantially the same as the signal reception corresponding to the location information of the portable apparatus 100 in operation S330 of FIG. 3, redundant description thereof will be omitted.

In operation S440 of FIG. 4, the remaining battery capacity is checked.

When the connection state between the portable apparatus 100 and the wearable apparatus 200 is the connection termination, the controller may detect power consumption of a battery (not illustrated) using a detector (not illustrated). In addition, the controller may calculate the remaining battery capacity (for example, 33% (not illustrated)) or an available battery time (for example, 1 day, 6 hours, and 5 minutes) using a voltage (or current) detected by the detector (not illustrated).

Figure 6D:
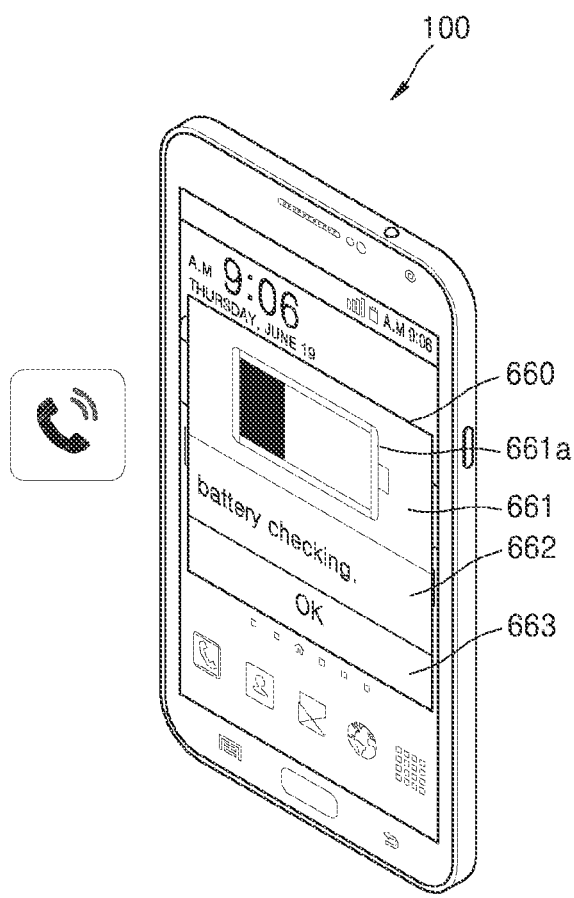

Referring to FIG. 6D, when the remaining capacity of the battery (not illustrated) is calculated, the controller may display a popup window 660 corresponding to the remaining battery capacity on the screen. The popup window 660 may include a symbol display region 661 in which a symbol 661*a* corresponding to the remaining battery capacity and a touch reception region 663 in which the user's input (for example, a touch or touch gesture) is received. In addition, the popup window 660 may further include a text display region 662 in which text corresponding to the check of the remaining battery capacity is displayed. The popup window 660 may include a remaining battery capacity value (for example, 33% (not illustrated)) in a region inside the symbol 661*a* or a region (which is not deviated from the symbol display region 661) outside the symbol 661*a*.

The storage unit may store the calculated remaining battery capacity and the calculated available battery time according to control of the controller.

In operation S450 of FIG. 4, a ringtone mode is determined.

When the connection state of the wearable apparatus 200 is the connection termination, the controller determines the ringtone mode of the portable apparatus 100. For example, the controller may determine whether the ringer mode of the portable apparatus 100 is the ringtone mode among the ringtone mode, the silent mode, and the vibration mode. The controller may determine one of the ringtone mode, the silent mode, and the vibration mode of the portable apparatus 100 as the ringer mode.

When the portable apparatus 100 is in the ringtone mode, the process proceeds to operation S460 of FIG. 4.

In operation S460 of FIG. 4, the location information and the remaining battery capacity information are transmitted to the wearable apparatus.

When the portable apparatus 100 is in the ringtone mode, the controller may transmit the location information and the remaining battery capacity information corresponding to the connection termination location of the portable apparatus 100 to the wearable apparatus 200 through the communication interface. When the connection between the portable apparatus 100 and the wearable apparatus 200 is terminated, the controller may transmit the location information and the remaining battery capacity information corresponding to the connection termination location of the portable apparatus 100 to the wearable apparatus 200 through the communication interface.

When a response corresponding to the reception of the location information and the remaining battery capacity information corresponding to the connection termination location to the portable apparatus 100 is received from the wearable apparatus 200, the controller may stop the transmission of the location information and the remaining battery capacity information corresponding to the periodically transmitted connection termination location.

The controller of the wearable apparatus 200 may receive the location information and the remaining battery capacity information corresponding to the connection termination location of the portable apparatus 100 through the mobile communication interface.

The storage unit may store the received location information and the received remaining battery capacity information corresponding to the connection termination location of the portable apparatus 100 according to control of the controller.

Figure 6E:
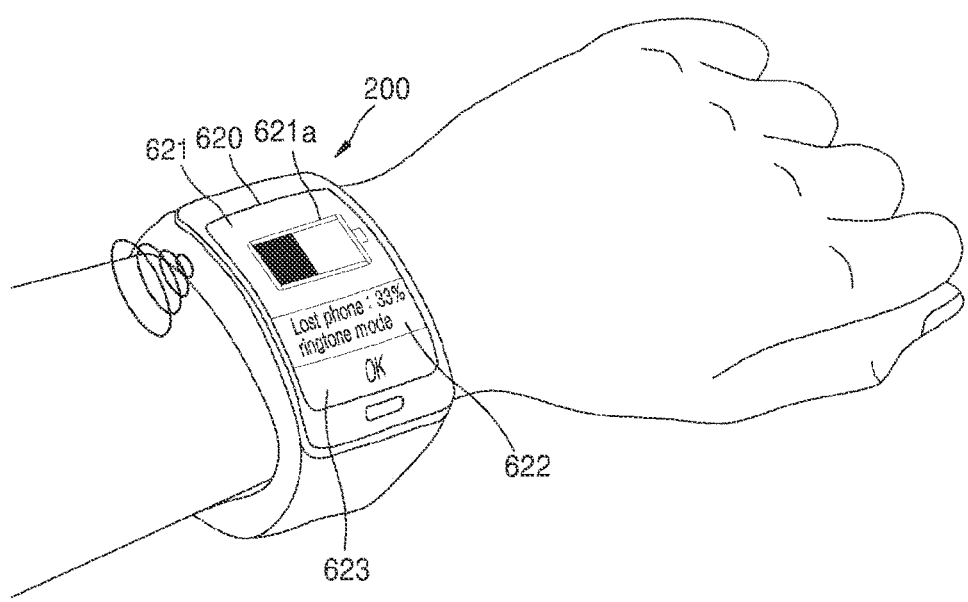

Referring to FIGS. 5E and 6E, the controller of the wearable apparatus 200 may display the received location information and the received remaining battery capacity information corresponding to the connection termination location of the portable apparatus 100 on the screen.

Because the display of a connection termination location 511 of the portable apparatus 100 and a current location 512 of the wearable apparatus 200 through the map application 510 on the screen in the wearable apparatus 200 is substantially the same as that of FIG. 5E, redundant description thereof will be omitted.

The controller may display the remaining battery capacity information 620 corresponding to the connection termination location 511 of the portable apparatus 100 through the battery management application (not illustrated) on the screen of the wearable apparatus 200. The remaining battery capacity information 660 displayed on the portable apparatus 100 and the remaining battery capacity information 620 displayed on the wearable apparatus 200 may be displayed in a changed size in correspondence with a screen size.

The remaining battery capacity information 620 may include a symbol display region 621 in which a symbol 621*a* corresponding to the remaining battery capacity is displayed, a text display region 622 in which text indicating a remaining battery capacity value (for example, 33%) and the ringer mode (for example, the ringtone mode) of the portable apparatus 100 is displayed, and a touch reception region 623 in which the user's input (for example, a touch or a touch gesture) is received.

The controller of the wearable apparatus 200 may provide the user with feedback corresponding to the reception of the location information and the remaining battery capacity information. The feedback provided from the wearable apparatus 200 may be provided as one of visual, auditory, and haptic feedback to the user. The controller may provide the user with one of the visual, auditory, and haptic feedback or a combination of the visual, auditory, and haptic feedback through the wearable apparatus 200.

The visual feedback may be displayed as a visual effect (for example, a separate image or an animation effect such as a fade applied to a separate image) corresponding to the reception of the location information and the remaining battery capacity information. The auditory feedback may be output as a sound corresponding to the reception of the location information and the remaining battery capacity information from the speaker. The haptic feedback may be output from the vibration motor in correspondence with the reception of the location information and the remaining battery capacity information.

In an environmental setting (not illustrated) of the wearable apparatus 200, it is possible to select and/or change the feedback (for example, at least one of visual, auditory, and haptic feedback) corresponding to the reception of the location information and the remaining battery capacity information.

The user may input and/or change a feedback providing time (which is, for example, 300 msec and changeable) in which at least one type of feedback is provided to the user.

The user may refer to the connection termination location 511 of the portable apparatus 100 displayed on the screen of the wearable apparatus 200 to find the portable apparatus 100.

When the portable apparatus 100 moves, the controller may transmit the location movement information, the remaining battery capacity information, and the ringer mode information to the wearable apparatus 200.

In operation S460 of FIG. 4, the method of controlling the location information of the portable apparatus is completed when the location information and the remaining battery capacity information are transmitted to the wearable apparatus.

When the portable apparatus is not in the ringtone mode in operation S450 of FIG. 4, the process proceeds to operation S470 of FIG. 4.

In operation S470 of FIG. 4, the location movement information, the remaining battery capacity information, and the ringer mode information are transmitted to the wearable apparatus.

When the portable apparatus 100 is in the silent mode, the controller may transmit the location information, the ringer mode (for example, silent mode) information, and the remaining battery capacity information corresponding to the connection termination location of the portable apparatus 100 to the wearable apparatus 200 through the communication interface. When the connection between the portable apparatus 100 and the wearable apparatus 200 is terminated, the controller may transmit the location information, the ringer mode information, and the remaining battery capacity information corresponding to the connection termination location of the portable apparatus 100 to the wearable apparatus 200 through the communication interface.

When a response corresponding to the reception of the location information, the ringer mode information, and the remaining battery capacity information corresponding to the connection termination location to the portable apparatus 100 is received from the wearable apparatus 200, the controller may stop the transmission of the location information and the remaining battery capacity information corresponding to the connection termination location periodically transmitted.

The controller of the wearable apparatus 200 may receive the location information, the ringer mode information, and the remaining battery capacity information corresponding to the connection termination location of the portable apparatus 100 through the mobile communication interface.

The storage unit may store the received location information, the received ringer mode information, and the received remaining battery capacity information corresponding to the connection termination location of the portable apparatus 100 according to control of the controller.

Figure 6F:
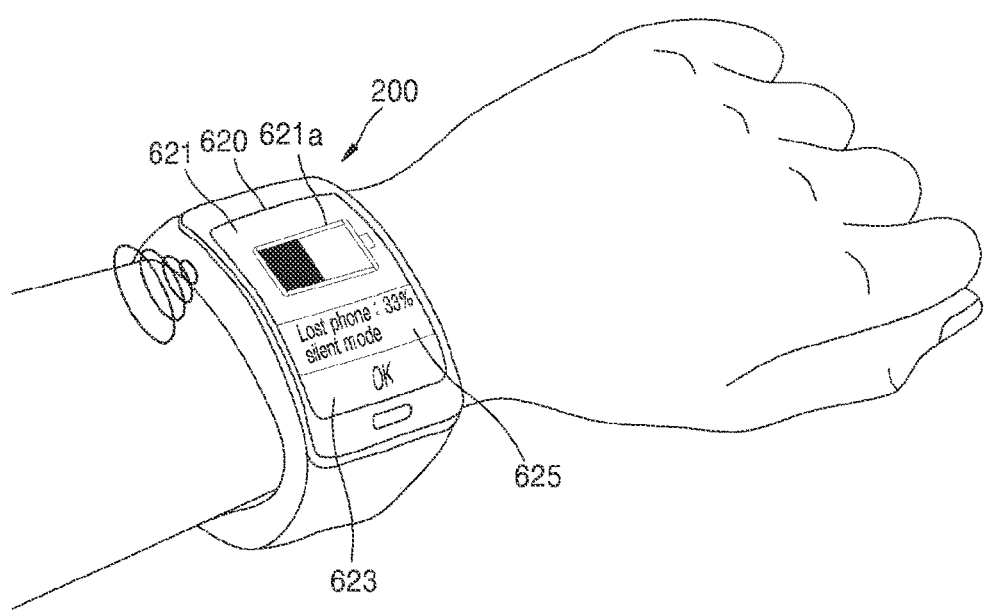

Referring to FIGS. 5E and 6F, the controller of the wearable apparatus 200 may display the received location information, the received ringer mode information, and the received remaining battery capacity information corresponding to the connection termination location of the portable apparatus 100 on the screen.

Because the display of a connection termination location 511 of the portable apparatus 100 and a current location 512 of the wearable apparatus 200 through the map application 510 on the screen in the wearable apparatus 200 is substantially the same as that of FIG. 5E, redundant description thereof will be omitted.

The controller may display the remaining battery capacity information 620 corresponding to the connection termination location 511 of the portable apparatus 100 through the battery management application (not illustrated) on the screen of the wearable apparatus 200. The remaining battery capacity information 660 displayed on the portable apparatus 100 and the remaining battery capacity information 620 displayed on the wearable apparatus 200 may be displayed in a changed size in correspondence with a screen size.

The remaining battery capacity information 620 may include a symbol display region 621 in which a symbol 621a corresponding to the remaining battery capacity is displayed, a text display region 625 in which text indicating a remaining battery capacity value (for example, 33%) and the ringer mode (for example, the ringtone mode) of the portable apparatus 100 is displayed, and a touch reception region 623 in which the user's input (for example, a touch or a touch gesture) is received. The controller may change and display a text display region 622 in correspondence with the ringer mode of the portable apparatus 100.

The controller of the wearable apparatus 200 may provide the user with feedback corresponding to the reception of the location information, the ringer mode information, and the remaining battery capacity information. The feedback provided from the wearable apparatus 200 may be provided as one of visual, auditory, and haptic feedback to the user. The controller may provide the user with one of the visual, auditory, and haptic feedback or a combination of the visual, auditory, and haptic feedback through the wearable apparatus 200.

Because the feedback provided to the user in operation S470 of FIG. 4 is substantially similar to the feedback provided to the user in operation S460 of FIG. 4, redundant description thereof will be omitted.

In operation 480 of FIG. 4, a ringer mode change request is received from the wearable apparatus.

Figure 6G:
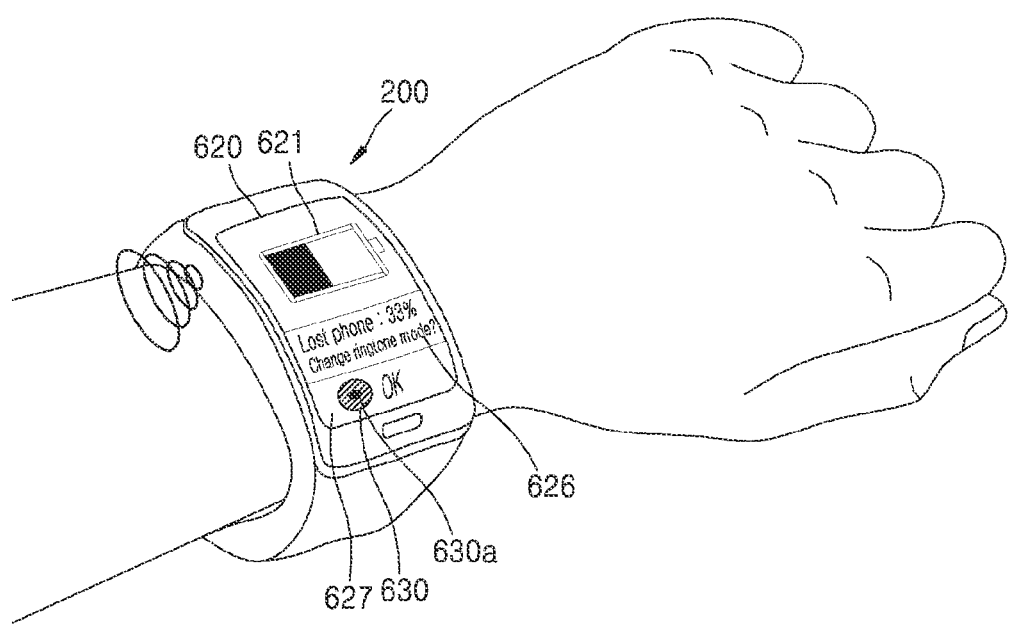

Referring to FIGS. 6F and 6G, the controller of the wearable apparatus 200 may change and display the text display region 622 in correspondence with the ringer mode (for example, the silent mode) of the portable apparatus 100. For example, text corresponding to change of the ringer mode (for example, "change ringer mode") of the portable apparatus 100 is displayed in the text display region 626 for the user.

When the text corresponding to change of the ringer mode is displayed in the text display region 626, the user performs a first touch 630 in the touch reception region 627. The controller may detect the first touch 630 using the touch screen and the touch screen controller. The controller may calculate a first touch location 630*a* (for example, X1 and Y1 coordinates) corresponding to the first touch 630 using an electric signal received from the touch screen controller.

The controller may store first touch location information corresponding to the first touch location 630*a* in the storage unit. The stored first touch location information may include a touch ID for history management, a touch location, a touch detection time, or touch information (for example, a touch pressure, a touch direction, a touch duration time, etc.).

The controller may transmit a control command (for example, a control packet) corresponding to a request for change of a ringer mode (for example, silent mode→ringtone mode) of the portable apparatus 100 to the portable apparatus 100 in correspondence with the first touch 630.

The storage unit may store a transmitted control command according to control of the controller.

The portable apparatus 100 may receive a control command corresponding to the transmitted ringer mode change request transmitted from the wearable apparatus 200.

The controller may store the received control command in the storage unit.

An embodiment in which the ringer mode of the portable apparatus 100 changes from the silent mode to the ringtone mode has been described with reference to FIG. 4, but embodiments of the present disclosure are not limited thereto. For example, when the ringer mode of the portable apparatus 100 is the vibration mode, the controller of the portable apparatus 100 may change the ringer mode of the portable apparatus 100 from the silent mode to the ringtone mode in correspondence with the received request of the wearable apparatus 200.

In operation S490 of FIG. 4, the portable apparatus changes to the ringtone mode.

Figure 6H:
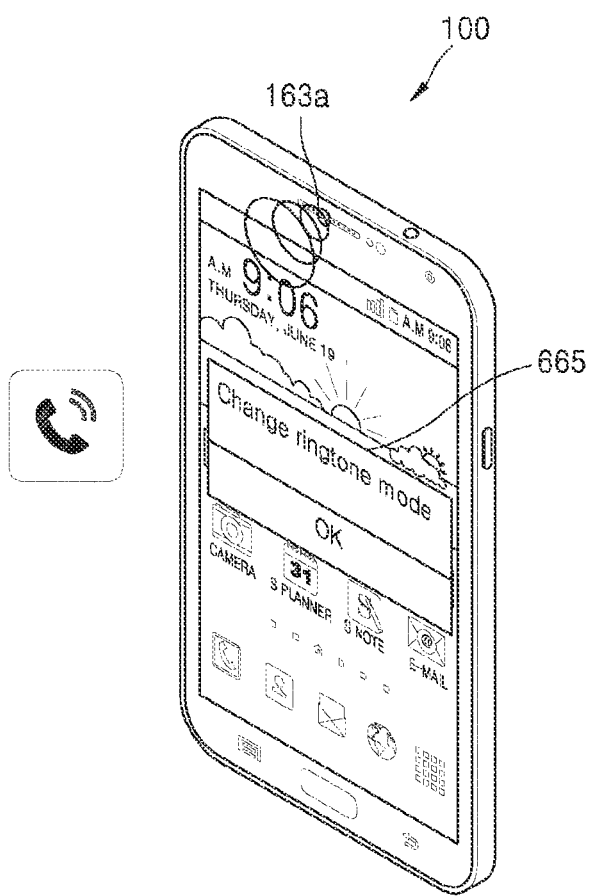

Referring to FIG. 6H, the controller may change the ringer mode of the portable apparatus 100 to the ringtone mode in correspondence with the received control command.

The controller may output a ringtone corresponding to the changed ringtone mode through the speaker 163*a*. The controller may output the ringtone at 70% or more of a maximum output of the speaker 163*a*.

The controller may display a popup window 665 corresponding to the ringtone mode change of the ringer mode on the screen.

In operation S490 of FIG. 4, the method of controlling the location information of the portable apparatus is completed when the ringer mode of the portable apparatus 100 changes to the ringtone mode.

Various embodiments may be implemented as program commands which may be performed by various kinds of computer means, and be recorded on a non-transitory computer-readable recording medium. The non-transitory computer-readable recording medium may include program commands, data files, data structures, and so on, solely or in combination. For example, any such software may be stored in a volatile or non-volatile storage device such as a ROM, or in a memory such as a RAM, a memory chip, a memory device or a memory integrated circuit, or in a storage medium, such as a compact disc (CD), a digital versatile disc (DVD), a magnetic disk or a magnetic tape, which is optically or magnetically recordable and simultaneously readable by a machine (e.g., a computer), regardless of whether the software may be deleted or rewritten. It will be appreciated that the memory which may be included in the mobile terminal is an example of a machine-readable storage medium suitable for storing a program or programs including instructions for implementing various embodiments of the present disclosure. The program commands recorded on the medium may be specially designed or configured for the present disclosure or well-known and available to persons skilled in the computer software art.

It should be understood that various embodiments described herein should be considered in a descriptive sense only and not for purposes of limitation. Descriptions of features or aspects within each embodiment should typically be considered as available for other similar features or aspects in other various embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of controlling location information of a portable apparatus, the method comprising:
    establishing a connection to a wearable apparatus using a first wireless communication;
    determining a termination of the connection between the portable apparatus and the wearable apparatus;
    activating at least one function for detecting a location of the portable apparatus, wherein the at least one function for detecting the location of the portable apparatus is not active when the connection between the portable apparatus and the wearable apparatus is terminated;
    externally receiving a signal corresponding to the location of the portable apparatus by using the at least one function which is activated when the connection is terminated; and
    transmitting location information representing the location of the portable apparatus to the wearable apparatus via a second wireless communication using a phone number of the portable apparatus,
    wherein the first wireless communication is a short-range wireless communication and the second wireless communication is a long-range mobile wireless communication that uses the phone number of the portable apparatus.

2. The method of claim 1, wherein the termination of the connection between the wearable apparatus and the portable apparatus is determined using a received signal strength indication/indicator (RSSI) of the received signal.

3. The method of claim 1, wherein the termination of the connection between the wearable apparatus and the portable apparatus is determined using OFF of a wireless profile link.

4. The method of claim 1, further comprising:
    calculating one of an outdoor location and an indoor location of the portable apparatus using the received signal.

5. The method of claim 1, further comprising:
    detecting a movement of the portable apparatus, wherein location movement information indicating the movement of the portable apparatus is transmitted to the wearable apparatus by using the second wireless communication.

6. The method of claim 5, wherein the movement of the portable apparatus is detected by using a sensor or a global positioning system (GPS) receiver.

7. The method of claim 1, further comprising:
detecting a remaining battery capacity of the portable apparatus.

8. The method of claim 7, further comprising:
determining a ringer mode of the portable apparatus,
wherein the ringer mode includes a ringtone mode, a silent mode, and a vibration mode.

9. The method of claim 8, wherein information about the remaining battery capacity and information about the ringer mode are transmitted to the wearable apparatus by using the second wireless communication.

10. The method of claim 9, further comprising:
receiving a control command corresponding to change of the ringer mode from the wearable apparatus,
wherein the ringer mode of the portable apparatus changes to the ringtone mode in correspondence with the received control command.

11. At least one non-transitory computer-readable recording medium for storing a computer program configured to be readable by at least one processor for instructing the at least one processor to execute a computer process for performing the method of claim 1.

12. A portable apparatus comprising:
a first communication interface configured to establish a connection to a wearable apparatus via a short-range wireless communication;
a second communication interface configured to establish a connection to the wearable apparatus via a long-range mobile wireless communication using a phone number of the portable apparatus;
a global positioning system (GPS) receiver configured to receive a signal from a GPS satellite; and
at least one processor configured to:
control the first communication interface, the second communication interface, and the GPS receiver,
detect termination of the connection between the first communication interface and the wearable apparatus,
activate at least one function for detecting a location of the portable apparatus, wherein the at least one function for detecting the location of the portable apparatus is not active when the connection between the first communication interface and the wearable apparatus is terminated,
calculate the location of the portable apparatus by using the at least one function which is activated when the connection is terminated according to a signal received through the GPS receiver, and
transmit location information indicating the calculated location to the wearable apparatus through the second communication interface.

13. The portable apparatus of claim 12, wherein the at least one processor is further configured to calculate an indoor location of the portable apparatus by using the first communication interface when the portable apparatus is located indoors.

14. The portable apparatus of claim 12, further comprising:
a sensor,
wherein the at least one processor is further configured to detect movement of the portable apparatus by using the sensor at a connection termination time.

15. The portable apparatus of claim 12, further comprising:
a detector,
wherein the at least one processor is further configured to detect a remaining battery capacity by using the detector at a connection termination time.

16. The portable apparatus of claim 12, wherein the at least one processor is further configured to determine a ringer mode of the portable apparatus at a connection termination time.

17. The portable apparatus of claim 12, wherein the at least one processor is further configured to:
receive a control command corresponding to change of a ringer mode from the wearable apparatus through the second communication interface, and
change the ringer mode of the portable apparatus to a ringtone mode in correspondence with the reception of the control command.

18. A method of controlling location information of a wearable apparatus, the method comprising:
establishing a connection of a first wireless communication to a portable apparatus via a short-range wireless communication;
when the connection of the first wireless communication to the portable apparatus is terminated, receiving location information of the portable apparatus from the portable apparatus through a second wireless communication using a phone number of the portable apparatus; and
displaying the received location information on a screen,
wherein the second wireless communication is a long-range mobile wireless communication that uses the phone number of the portable apparatus, and
wherein, when the connection of the first wireless communication to the portable apparatus is terminated, the portable apparatus is configured to:
activate at least one function, wherein the at least one function is not active when the connection is terminated, and
detect a location of the portable apparatus using the at least one function which is activated when the connection is terminated.

19. The method of claim 18, further comprising:
receiving location movement information of the portable apparatus corresponding to movement of the portable apparatus; and
displaying the received location movement information on the screen,
wherein the connection termination location of the portable apparatus, a current location of the portable apparatus, and a current location of the wearable apparatus are displayed on the screen.

20. At least one non-transitory computer-readable recording medium for storing a computer program configured to be readable by at least one processor for instructing the at least one processor to execute a computer process for performing the method of claim 18.

* * * * *